(12) United States Patent
Chono et al.

(10) Patent No.: US 10,110,892 B2
(45) Date of Patent: Oct. 23, 2018

(54) VIDEO ENCODING DEVICE, VIDEO DECODING DEVICE, VIDEO ENCODING METHOD, VIDEO DECODING METHOD, AND PROGRAM

(71) Applicant: NEC Corporation, Tokyo (JP)

(72) Inventors: Keiichi Chono, Tokyo (JP); Hirofumi Aoki, Tokyo (JP); Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 14/355,455

(22) PCT Filed: Oct. 25, 2012

(86) PCT No.: PCT/JP2012/006852
§ 371 (c)(1),
(2) Date: Apr. 30, 2014

(87) PCT Pub. No.: WO2013/065265
PCT Pub. Date: May 10, 2013

(65) Prior Publication Data
US 2014/0307779 A1  Oct. 16, 2014

(30) Foreign Application Priority Data

Nov. 1, 2011 (JP) .................................. 2011-240538
Apr. 4, 2012 (JP) .................................. 2012-085821

(51) Int. Cl.
*H04N 19/70* (2014.01)
*H04N 19/12* (2014.01)
(Continued)

(52) U.S. Cl.
CPC ....... *H04N 19/00884* (2013.01); *H04N 19/12* (2014.11); *H04N 19/156* (2014.11);
(Continued)

(58) Field of Classification Search
CPC ............. H04N 19/00884; H04N 19/12; H04N 19/156; H04N 19/176; H04N 19/463;
(Continued)

(56) References Cited

U.S. PATENT DOCUMENTS

2005/0163213 A1* 7/2005 Suzuki ................ H04N 19/172
375/240.01
2006/0227878 A1  10/2006 Mori et al.
(Continued)

FOREIGN PATENT DOCUMENTS

CN    101816182 A    8/2010
CN    101933331 A    12/2010

OTHER PUBLICATIONS

B. Bross et al., "WD4: Working Draft 4 of High-Efficiency Video Coding", JCTVC-F803_d1, Joint Collaborative Team on Video Coding (JCT-VC) of ITU-T SG16 WP3 and ISO/IEC JTC1/SC29/WG11 6th Meeting, Jul. 2011.
(Continued)

*Primary Examiner* — Nathnael Aynalem
(74) *Attorney, Agent, or Firm* — Finnegan, Henderson, Farabow, Garrett & Dunner, L.L.P.

(57) ABSTRACT

A video encoding device includes: a transformer for transforming an image block; an entropy encoder for entropy-encoding transformed data of the image block transformed by the transformer; a PCM encoder for PCM-encoding an image block; a multiplexed data selector for selecting output data of the entropy encoder or output data of the PCM encoder, for each block of an externally set block size; and a multiplexer for embedding a PCM header into a bitstream, in a block of the externally set block size, wherein the number of successive PCM-encoded blocks is embedded into the PCM header, and PCM data for the number of successive PCM-encoded blocks is multiplexed into the bitstream.

6 Claims, 40 Drawing Sheets

(51) Int. Cl.
*H04N 19/13* (2014.01)
*H04N 19/176* (2014.01)
*H04N 19/156* (2014.01)
*H04N 19/463* (2014.01)

(52) U.S. Cl.
CPC ......... *H04N 19/176* (2014.11); *H04N 19/463* (2014.11); *H04N 19/70* (2014.11)

(58) Field of Classification Search
CPC .... H04N 19/70; H04N 19/172; H04N 19/184; H04N 19/46; H04N 19/503; H04N 19/593; H04N 19/61; H04N 19/00121; H04N 19/91; H04N 19/13; H04N 19/122; H04N 19/174; H04N 19/17; H04N 19/177; H04N 19/60
USPC ........................................ 375/240.01–240.29
See application file for complete search history.

(56) References Cited

U.S. PATENT DOCUMENTS

| | | | | |
|---|---|---|---|---|
| 2007/0280353 | A1* | 12/2007 | Arakawa | H04N 19/176 375/240.12 |
| 2009/0097567 | A1 | 4/2009 | Shigeta et al. | |
| 2009/0279604 | A1 | 11/2009 | Chono et al. | |
| 2010/0177820 | A1* | 7/2010 | Chono | H04N 19/196 375/240.03 |
| 2010/0208794 | A1* | 8/2010 | Ohgose | H04N 19/176 375/240.02 |
| 2010/0238998 | A1* | 9/2010 | Nanbu | H03M 7/4006 375/240.03 |
| 2012/0051426 | A1* | 3/2012 | Takagi | H04N 19/147 375/240.12 |

OTHER PUBLICATIONS

K. Chono et al., "Pulse code modulation mode for HEVC", Joint Collaborative Team on Video Coding (JCT-VC) of ITU-T SG16 WP3 and ISO/IEC JTC1/SC29/WG11 5$^{th}$ Meeting, Mar. 2011.

International Search Report and Written Opinion of ISA dated Jan. 29, 2013.

K. Chono, "Potential enhancement of signaling of I_PCM blocks", JCTVC-G118, Joint Collaborative Team on Video Coding (JCT-VC) of ITU-T SG16 WP3 and ISO/IEC JTC1/SC29/WG11 7$^{th}$ Meeting, Nov. 2011.

Extended European Search Report dated May 13, 2015 by the European Patent Office in counterpart European Patent Application No. 12845857.7.

Chinese Office Action dated Jul. 1, 2016, by the Chinese Patent Office in counterpart Chinese Patent Application 201280053923.2.

* cited by examiner

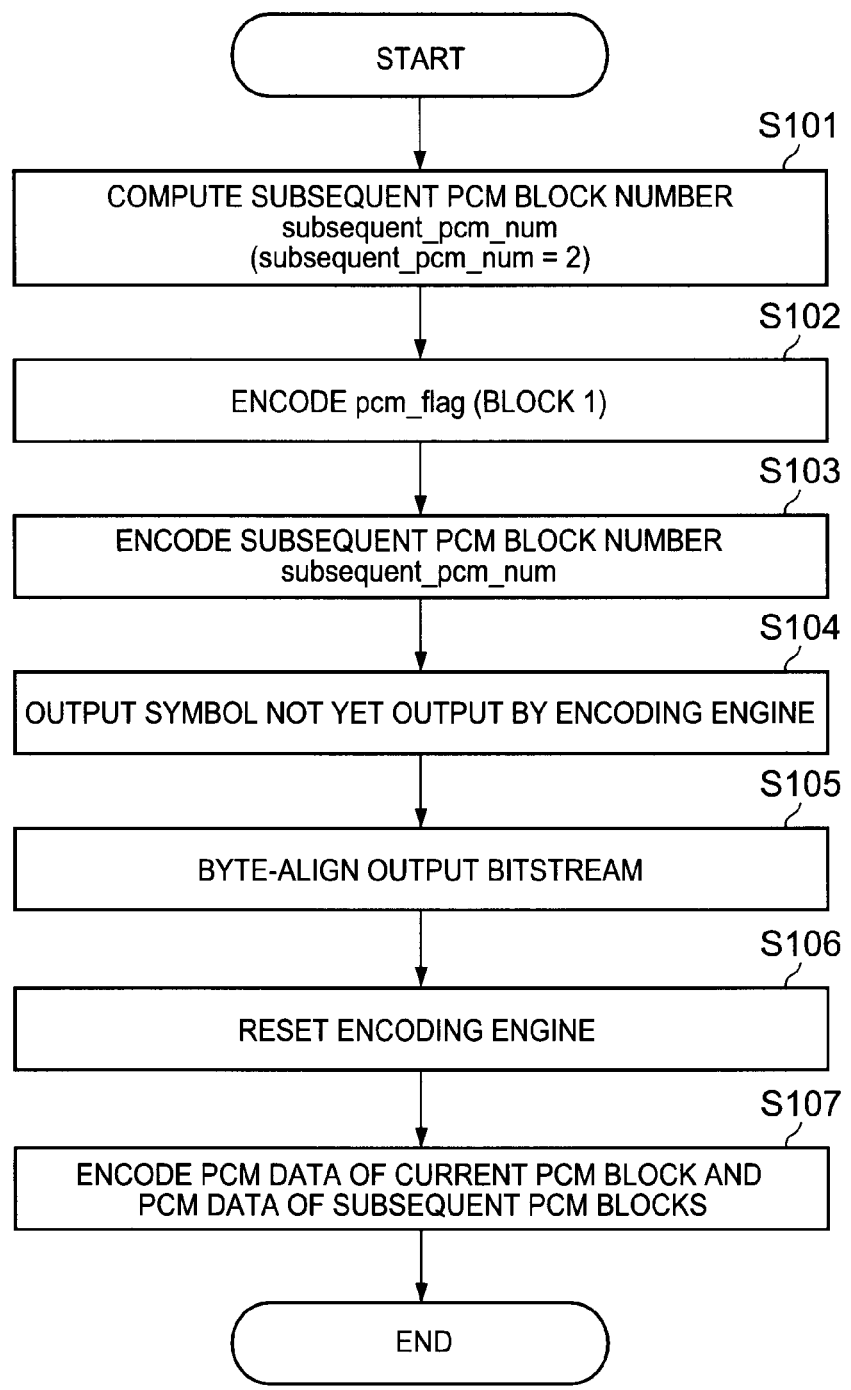

FIG. 3A (7.3.5 Coding tree syntax)

| coding_tree( x0, y0, log2CUSize ) { | Descriptor |
|---|---|
|   *if( log2CUSize > Log2MinCUSize)* | |
|     *NumPCMBlock = 0* | |
|   if( x0 + ( 1 << log2CUSize ) <= PicWidthInSamples$_L$ &&<br>    y0 + ( 1 << log2CUSize ) <= PicHeightInSamples$_L$ &&<br>    cuAddress( x0, y0 ) >= SliceAddress ) { | |
|     if( !entropy_coding_mode_flag && slice_type != I ) | |
|       cu_split_pred_part_mode[ x0 ][ y0 ] | ce(v) |
|     else if( log2CUSize > Log2MinCUSize ) | |
|       split_coding_unit_flag[ x0 ][ y0 ] | u(1) \| ae(v) |
|   } | |
|   if( adaptive_loop_filter_flag && alf_cu_control_flag ) { | |
|     cuDepth = Log2MaxCUSize – log2CUSize | |
|     if( cuDepth <= alf_cu_control_max_depth ) | |
|       if( cuDepth == alf_cu_control_max_depth \|\| | |
|         split_coding_unit_flag[ x0 ][ y0 ] == 0 ) | |
|         AlfCuFlagIdx++ | |
|   } | |
|   if( split_coding_unit_flag[ x0 ][ y0 ] ) { | |
|     if( cu_qp_depta_enabled_flag &&<br>      log2CUSize == log2MinCUDQPSize ) | |
|     IsCuQpDeltaCoded = 0 | |
|     x1 = x0 + ( ( 1 << log2CUSize ) >> 1 ) | |
|     y1 = y0 + ( ( 1 << log2CUSize ) >> 1 ) | |
|     if( cuAddress( x1, y0 ) > SliceAddress ) | |
|       moreDataFlag = coding_tree( x0, y0, log2CUSize – 1 ) | |
|     if( cuAddress( x0, y1 ) > SliceAddress && moreDataFlag &&<br>      x1 < PicWidthInSamples$_L$ ) | |
|       moreDataFlag = coding_tree( x1, y0, log2CUSize – 1 ) | |
|     if( cuAddress( x1, y1 ) > SliceAddress && moreDataFlag &&<br>      y1 < PicHeightInSamples$_L$ ) | |
|       moreDataFlag = coding_tree( x0, y1, log2CUSize – 1 ) | |
|     if( moreDataFlag &&<br>      x1 < PicWidthInSamples$_L$ &&  y1 < PicHeightInSamples$_L$ ) | |
|       moreDataFlag = coding_tree( x1, y1, log2CUSize – 1 ) | |
|   } else { | |

FIG. 3B

| | |
|---|---|
| if(adaptive_loop_filter_flag && alf_cu_control_flag ) | |
|     AlfCuFlag[ x0 ][ y0 ] = alf_cu_flag[ AlfCuFlagIdx ] | |
| *if(NumPCMBlock == 0)* | |
|     coding_unit( x0, y0, log2CUSize ) | |
| *else* | |
|     *NumPCMBlock--* | |
| *If(NumPCMBlock== 0) {* | |
|     if( !entropy_coding_mode_flag ) | |
|         moreDataFlag = more_rbsp_data( ) | |
|     else { | |
|         If( granularity_block_boundary( x0, y0, log2CUSize ) ) { | |
|             end_of_slice_flag | ae(v) |
|             moreDataFlag = !end_of_slice_flag | |
|         } else | |
|             moreDataFlag = 1 | |
|     } | |
| *}* | |
| *else* | |
|     *moreDataFlag = 1* | |
| } | |
| return moreDataFlag | |
| } | |

FIG. 4A (7.3.6 Coding unit syntax)

| coding_unit( x0, y0, log2CUSize ) { | Descriptor |
|---|---|
|   if( entropy_coding_mode_flag && slice_type != I ) | |
|     skip_flag[ x0 ][ y0 ] | u(1) \| ae(v) |
|   if( skip_flag[ x0 ][ y0 ] ) | |
|     prediction_unit( x0, y0 ) | |
|   else { | |
|     if( !entropy_coding_mode_flag ) { | |
|       if( slice_type == I && log2CUSize == Log2MinCUSize ) | |
|         intra_part_mode | u(1) |
|     } else if( slice_type != I \|\| log2CUSize == Log2MinCUSize ) | |
|       pred_type | u(v) \| ae(v) |
|     x1 = x0 + ( ( 1 << log2CUSize ) >> 1 ) | |
|     y1 = y0 + ( ( 1 << log2CUSize ) >> 1 ) | |
|     x2 = x1 - ( ( 1 << log2CUSize ) >> 2 ) | |
|     y2 = y1 - ( ( 1 << log2CUSize ) >> 2 ) | |
|     x3 = x1 + ( ( 1 << log2CUSize ) >> 2 ) | |
|     y3 = y1 + ( ( 1 << log2CUSize ) >> 2 ) | |
|     if( PartMode == PART_2Nx2N ) { | |
|       prediction_unit( x0, y0, log2CUSize ) | |
|     } else if( PartMode == PART_2NxN ) { | |
|       prediction_unit( x0, y0, log2CUSize ) | |
|       prediction_unit( x0, y1, log2CUSize ) | |
|     } else if( PartMode == PART_Nx2N ) { | |
|       prediction_unit( x0, y0, log2CUSize ) | |
|       prediction_unit( x1, y0, log2CUSize ) | |
|     } else if( PartMode == PART_2NxnU ) { | |
|       prediction_unit( x0, y0, log2CUSize ) | |
|       prediction_unit( x0, y2, log2CUSize ) | |
|     } else if( PartMode == PART_2NxnD ) { | |
|       prediction_unit( x0, y0, log2CUSize ) | |
|       prediction_unit( x0, y3, log2CUSize ) | |
|     } else if( PartMode == PART_nLx2N ) { | |
|       prediction_unit( x0, y0, log2CUSize ) | |
|       prediction_unit( x2, y0, log2CUSize ) | |
|     } else if( PartMode == PART_nRx2N ) { | |
|       prediction_unit( x0, y0, log2CUSize ) | |

FIG. 4B

| | |
|---|---|
|     prediction_unit( x3, y0, log2CUSize ) | |
|   } else { /* PART_NxN */ | |
|     prediction_unit( x0, y0, log2CUSize ) | |
|     prediction_unit( x1, y0, log2CUSize ) | |
|     prediction_unit( x0, y1, log2CUSize ) | |
|     prediction_unit( x1, y1, log2CUSize ) | |
|   } | |
| } | |
| if( !pcm_flag ) { | |
|   transform_tree( x0, y0, log2CUSize, log2CUSize, 0, 0 ) | |
|   transform_coeff( x0, y0, log2CUSize, log2CUSize, 0, 0 ) | |
|   transform_coeff( x0, y0, log2CUSize, log2CUSize, 0, 1 ) | |
|   transform_coeff( x0, y0, log2CUSize, log2CUSize, 0, 2 ) | |
| } | |
| } | |

FIG. 5A (7.3.7 Prediction unit syntax)

| prediction_unit( x0, y0, log2CUSize ) { | Descriptor |
|---|---|
| if( skip_flag[ x0 ][ y0 ] ) { | |
|    merge_idx[ x0 ][ y0 ] | ue(v) \| ae(v) |
| } else if( PredMode == MODE_INTRA ) { | |
|   if( PartMode == PART_2Nx2N && log2CUSize >= Log2MinIPCMCUSize ) | |
|    pcm_flag | u(1) \| ae(v) |
|   if( pcm_flag ) { | |
|    *if( log2CUSize == Log2MinCUSize){* | |
|     *subsequent_pcm_num* | u(v) \| ae(v) |
|     *NumPCMBlock=1 + subsequent_pcm_num* | |
|    *}* | |
|    *else* | |
|     *NumPCMBlock=1* | |
|    while ( !byte_aligned( ) ) | |
|     pcm_alignment_zero_bit | u(v) |
|    *for(j = 0; j < NumPCMBlock; j++ ){* | |
|     for( i = 0; i < 1 << ( log2CUSize << 1 ); i++ ) | |
|      pcm_sample_luma[ i ] | u(v) |
|     for( i = 0; i < ( 1 << ( log2CUSize << 1 ) ) >> 1; i++ ) | |
|      pcm_sample_chroma[ i ] | u(v) |
|    *}* | |
|    *NumPCMBlock--* | |
|   } else { | |
|    prev_intra_luma_pred_flag[ x0 ][ y0 ] | u(1) \| ae(v) |
|    if( prev_intra_luma_pred_flag[ x0 ][ y0 ] ) | |
|     if( NumMPMCand > 1 ) | |
|      mpm_idx[ x0 ][ y0 ] | u(1) \| ae(v) |
|    else | |
|     rem_intra_luma_pred_mode[ x0 ][ y0 ] | ce(v) \| ae(v) |
|    if( IntraPredMode[ x0 ][ y0 ] == 2 ) | |
|     planar_flag_luma[ x0 ][ y0 ] | u(1) \| ae(v) |
|    intra_chroma_pred_mode[ x0 ][ y0 ] | ue(v) \| ae(v) |

FIG. 5B

| | |
|---|---|
| SignaledAsChromaDC = <br>  ( chroma_pred_from_luma_enabled_flag ? <br>    Intra_chroma_pred_mode[ x0 ][ y0 ] == 3 : <br>    Intra_chroma_pred_mode[ x0 ][ y0 ] == 2 ) | |
| If( IntraPredMode[ x0 ][ y0 ] != 2 && <br>    IntraPredMode[ x0 ][ y0 ] != 34 && SignaledAsChromaDC ) | |
| Planar_flag_chroma[ x0 ][ y0 ] | u(1) \| ae(v) |
| } | |
| } else { /* MODE_INTER */ | |
| if( entropy_coding_mode_flag \|\| PartMode != PART_2Nx2N ) | |
| merge_flag[ x0 ][ y0 ] | u(1) \| ae(v) |
| if( merge_flag[ x0 ][ y0 ] ) { | |
| merge_idx[ x0 ][ y0 ] | ue(1) \| ae(v) |
| } else { | |
| if( slice_type = = B ) { | |
| if( !entropy_coding_mode_flag ) { | |
| combined_inter_pred_ref_idx | ue(v) |
| if( combined_inter_pred_ref_idx == MaxPredRef ) | |
| inter_pred_flag[ x0 ][ y0 ] | ue(v) |
| } else | |
| inter_pred_flag[ x0 ][ y0 ] | ue(v) \| ae(v) |
| } | |
| if( inter_pred_flag[ x0 ][ y0 ] = = Pred_LC ) { | |
| If( num_ref_idx_lc_active_minus1 > 0 ) { | |
| If( !entropy_coding_mode_flag ) { | |
| if( combined_inter_pred_ref_idx == MaxPredRef ) | |
| ref_idx_lc_minus4[ x0 ][ y0 ] | ue(v) |
| } else | |
| ref_idx_lc[ x0 ][ y0 ] | ae(v) |
| } | |
| mvd_lc[ x0 ][ y0 ][ 0 ] | se(v) \| ae(v) |
| mvd_lc[ x0 ][ y0 ][ 1 ] | se(v) \| ae(v) |
| mvp_idx_lc[ x0 ][ y0 ] | ue(v) \| ae(v) |
| } | |
| else { /* Pred_L0 or Pred_BI */ | |
| If( num_ref_idx_l0_active_minus1 > 0 ) { | |
| if( !entropy_coding_mode_flag) { | |

FIG. 5C

| | |
|---|---|
| if( combined_inter_pred_ref_idx == MaxPredRef ) | |
| ref_idx_l0_minusX[ x0 ][ y0 ] | ue(v) |
| } else | |
| ref_idx_l0_minusX[ x0 ][ y0 ] | ue(v) \| ae(v) |
| } | |
| mvd_l0[ x0 ][ y0 ][ 0 ] | se(v) \| ae(v) |
| mvd_l0[ x0 ][ y0 ][ 1 ] | se(v) \| ae(v) |
| mvp_idx_l0[ x0 ][ y0 ] | ue(v) \| ae(v) |
| } | |
| If( inter_pred_flag[ x0 ][ y0 ] = = Pred_BI ) { | |
| If( num_ref_idx_l1_active_minus1 > 0) { | |
| If( !entropy_coding_mode_flag) { | |
| if( combined_inter_pred_ref_idx == MaxPredRef ) | |
| ref_idx_l1_minusX[ x0 ][ y0 ] | ue(v) |
| } else | |
| ref_idx_l1[ x0 ][ y0 ] | ue(v) \| ae(v) |
| } | |
| mvd_l1[ x0 ][ y0 ][ 0 ] | se(v) \| ae(v) |
| mvd_l1[ x0 ][ y0 ][ 1 ] | se(v) \| ae(v) |
| mvp_idx_l1[ x0 ][ y0 ] | ue(v) \| ae(v) |
| } | |
| } | |
| } | |
| } | | subsequent_pcm_num specifies the number of subsequent I-PCM coding units associated with the current log2CUSize that successively follow the current I-PCM coding unit. The value subsequent_pcm_num shall be in the range of 0 to 3, inclusive. When the subsequent_pcm_num is not present, it shall be inferred to be 0.

| subsequent_pcm_num | binary representation | | |
|---|---|---|---|
| | 1st | 2nd | 3rd |
| 0 | 0 | | |
| 1 | 1 | 0 | |
| 2 | 1 | 1 | 0 |
| 3 | 1 | 1 | 1 |

(BINARY REPRESENTATION OF subsequent_pcm_num SYNTAX FOR CABAC)
(NOT ADAPTIVE TO Quad-tree BLOCK POSITION)

(B)

| subsequent_pcm_num | variable length code |
|---|---|
| 0 | 0 |
| 1 | 10 |
| 2 | 110 |
| 3 | 111 |

(VARIABLE LENGTH CODE OF subsequent_pcm_num SYNTAX FOR CAVLC)
(NOT ADAPTIVE TO Quad-tree BLOCK POSITION)

FIG. 10

(7.3.4 Slice data syntax)

| slice_data( ) { | Descriptor |
|---|---|
|    CurrTbAddr = LCUAddress | |
|    moreDataFlag = 1 | |
|    if( adaptive_loop_filter_flag && alf_cu_control_flag ) | |
|      AlfCuFlagIdx = -1 | |
|    do { | |
|      xCU = HorLumaLocation( CurrTbAddr ) | |
|      yCU = VerLumaLocation( CurrTbAddr ) | |
|      *NumPCMBlock = 0* | |
|      moreDataFlag = coding_tree( xCU, yCU, Log2TbSize ) | |
|      CurrTbAddr = NextTbAddress( CurrTbAddr ) | |
|    } while( moreDataFlag ) | |
| } | |

FIG. 11A (7.3.5 Coding tree syntax)

| coding_tree( x0, y0, log2CUSize ) { | Descriptor |
|---|---|
| if( x0 + ( 1 << log2CUSize ) <= PicWidthInSamples$_L$ && y0 + ( 1 << log2CUSize ) <= PicHeightInSamples$_L$ && cuAddress( x0, y0 ) >= SliceAddress NumPCMBlock == 0 ) { | |
| if( !entropy_coding_mode_flag && slice_type != I ) | |
| cu_split_pred_part_mode[ x0 ][ y0 ] | ce(v) |
| else if( log2CUSize > Log2MinCUSize ) | |
| split_coding_unit_flag[ x0 ][ y0 ] | u(1) \| ae(v) |
| } | |
| if( adaptive_loop_filter_flag && alf_cu_control_flag ) { | |
| cuDepth = Log2MaxCUSize – log2CUSize | |
| if( cuDepth <= alf_cu_control_max_depth ) | |
| if( cuDepth == alf_cu_control_max_depth \|\| | |
| split_coding_unit_flag[ x0 ][ y0 ] == 0 ) | |
| AlfCuFlagIdx++ | |
| } | |
| if( split_coding_unit_flag[ x0 ][ y0 ] ) { | |
| if( cu_qp_depta_enabled_flag && log2CUSize == log2MinCUDQPSize ) | |
| IsCuQpDeltaCoded = 0 | |
| x1 = x0 + ( ( 1 << log2CUSize ) >> 1 ) | |
| y1 = y0 + ( ( 1 << log2CUSize ) >> 1 ) | |
| if( cuAddress( x1, y0 ) > SliceAddress ) | |
| moreDataFlag = coding_tree( x0, y0, log2CUSize – 1 ) | |
| if( cuAddress( x0, y1 ) > SliceAddress && moreDataFlag && x1 < PicWidthInSamples$_L$ ) | |
| moreDataFlag = coding_tree( x1, y0, log2CUSize – 1 ) | |
| if( cuAddress( x1, y1 ) > SliceAddress && moreDataFlag && y1 < PicHeightInSamples$_L$ ) | |
| moreDataFlag = coding_tree( x0, y1, log2CUSize – 1 ) | |
| if( moreDataFlag && x1 < PicWidthInSamples$_L$ && y1 < PicHeightInSamples$_L$ ) | |
| moreDataFlag = coding_tree( x1, y1, log2CUSize – 1 ) | |
| } else { | |
| if(adaptive_loop_filter_flag && alf_cu_control_flag ) | |

FIG. 11B

| | |
|---|---|
| AlfCuFlag[ x0 ][ y0 ] = alf_cu_flag[ AlfCuFlagIdx ] | |
| *if(NumPCMBlock == 0 )* | |
|    coding_unit( x0, y0, log2CUSize ) | |
| *else* | |
|    *NumPCMBlock--* | |
|    *if(NumPCMBlock == 0) {* | |
|       if( !entropy_coding_mode_flag ) | |
|          moreDataFlag = more_rbsp_data( ) | |
|       else { | |
|          If( granularity_block_boundary( x0, y0, log2CUSize ) ) { | |
|             end_of_slice_flag | ae(v) |
|             moreDataFlag = !end_of_slice_flag | |
|          } else | |
|             moreDataFlag = 1 | |
|       } | |
|    *}* | |
|    *else* | |
|       *moreDataFlag = 1* | |
|    } | |
|    return moreDataFlag | |
| } | |

FIG. 12A (7.3.6 Coding unit syntax)

| coding_unit( x0, y0, log2CUSize ) { | Descriptor |
|---|---|
| if( entropy_coding_mode_flag && slice_type != I ) | |
| skip_flag[ x0 ][ y0 ] | u(1) \| ae(v) |
| if( skip_flag[ x0 ][ y0 ] ) | |
| prediction_unit( x0, y0 ) | |
| else { | |
| if( !entropy_coding_mode_flag ) { | |
| if( slice_type == I && log2CUSize == Log2MinCUSize ) | |
| intra_part_mode | u(1) |
| } else if( slice_type != I \|\| log2CUSize == Log2MinCUSize ) | |
| pred_type | u(v) \| ae(v) |
| x1 = x0 + ( ( 1 << log2CUSize ) >> 1 ) | |
| y1 = y0 + ( ( 1 << log2CUSize ) >> 1 ) | |
| x2 = x1 - ( ( 1 << log2CUSize ) >> 2 ) | |
| y2 = y1 - ( ( 1 << log2CUSize ) >> 2 ) | |
| x3 = x1 + ( ( 1 << log2CUSize ) >> 2 ) | |
| y3 = y1 + ( ( 1 << log2CUSize ) >> 2 ) | |
| if( PartMode == PART_2Nx2N ) { | |
| prediction_unit( x0, y0, log2CUSize ) | |
| } else if( PartMode == PART_2NxN ) { | |
| prediction_unit( x0, y0, log2CUSize ) | |
| prediction_unit( x0, y1, log2CUSize ) | |
| } else if( PartMode == PART_Nx2N ) { | |
| prediction_unit( x0, y0, log2CUSize ) | |
| prediction_unit( x1, y0, log2CUSize ) | |
| } else if( PartMode == PART_2NxnU ) { | |
| prediction_unit( x0, y0, log2CUSize ) | |
| prediction_unit( x0, y2, log2CUSize ) | |
| } else if( PartMode == PART_2NxnD ) { | |
| prediction_unit( x0, y0, log2CUSize ) | |
| prediction_unit( x0, y3, log2CUSize ) | |
| } else if( PartMode == PART_nLx2N ) { | |
| prediction_unit( x0, y0, log2CUSize ) | |
| prediction_unit( x2, y0, log2CUSize ) | |
| } else if( PartMode == PART_nRx2N ) { | |
| prediction_unit( x0, y0, log2CUSize ) | |

FIG. 12B

| | |
|---|---|
| prediction_unit( x3, y0, log2CUSize ) | |
| } else { /* PART_NxN */ | |
| prediction_unit( x0, y0, log2CUSize ) | |
| prediction_unit( x1, y0, log2CUSize ) | |
| prediction_unit( x0, y1, log2CUSize ) | |
| prediction_unit( x1, y1, log2CUSize ) | |
| } | |
| } | |
| if( !pcm_flag ) { | |
| transform_tree( x0, y0, log2CUSize, log2CUSize, 0, 0 ) | |
| transform_coeff( x0, y0, log2CUSize, log2CUSize, 0, 0 ) | |
| transform_coeff( x0, y0, log2CUSize, log2CUSize, 0, 1 ) | |
| transform_coeff( x0, y0, log2CUSize, log2CUSize, 0, 2 ) | |
| } | |
| } | |

FIG. 13A (7.3.7 prediction unit syntax)

| prediction_unit( x0, y0, log2CUSize ) { | Descriptor |
|---|---|
| if( skip_flag[ x0 ][ y0 ] ) { | |
|     merge_idx[ x0 ][ y0 ] | ue(v) \| ae(v) |
| } else if( PredMode  = =  MODE_INTRA ) { | |
|     if( PartMode == PART_2Nx2N && <br>    log2CUSize >= Log2MinIPCMCUSize ) | |
|       pcm_flag | u(1) \| ae(v) |
|     if( pcm_flag ) { | |
|       *subsequent_pcm_num* | u(v) \| ae(v) |
|       *NumPCMBlock=1 + subsequent_pcm_num* | |
|       while ( !byte_aligned( ) ) | |
|         pcm_alignment_zero_bit | u(v) |
|       *for(j = 0; j < NumPCMBlock; j++ ){* | |
|         for( i = 0; i < 1 << ( log2CUSize << 1 ); i++ ) | |
|           pcm_sample_luma[ i ] | u(v) |
|         for( i = 0; i < ( 1 << ( log2CUSize << 1 ) ) >> 1; i++ ) | |
|           pcm_sample_chroma[ i ] | u(v) |
|       *}* | |
|       *NumPCMBlock--* | |
|     } else { | |
|       prev_intra_luma_pred_flag[ x0 ][ y0 ] | u(1) \| ae(v) |
|     if( prev_intra_luma_pred_flag[ x0 ][ y0 ] ) | |
|       if( NumMPMCand > 1 ) | |
|         mpm_idx[ x0 ][ y0 ] | u(1) \| ae(v) |
|     else | |
|       rem_intra_luma_pred_mode[ x0 ][ y0 ] | ce(v) \| ae(v) |
|     if( IntraPredMode[ x0 ][ y0 ] == 2 ) | |
|       planar_flag_luma[ x0 ][ y0 ] | u(1) \| ae(v) |
|     intra_chroma_pred_mode[ x0 ][ y0 ] | ue(v) \| ae(v) |
|     SignaledAsChromaDC = <br>      ( chroma_pred_from_luma_enabled_flag ? <br>        intra_chroma_pred_mode[ x0 ][ y0 ] == 3 : <br>        intra_chroma_pred_mode[ x0 ][ y0 ] == 2 ) | |
|     if( IntraPredMode[ x0 ][ y0 ] != 2 && <br>      IntraPredMode[ x0 ][ y0 ]!=34 && SignaledAsChromaDC ) | |
|       planar_flag_chroma[ x0 ][ y0 ] | u(1) \| ae(v) |

FIG. 13B

| | |
|---|---|
| } | |
| } else { /* MODE_INTER */ | |
| if( entropy_coding_mode_flag \|\| PartMode != PART_2Nx2N ) | |
| merge_flag[ x0 ][ y0 ] | u(1) \| ae(v) |
| if( merge_flag[ x0 ][ y0 ] ) { | |
| merge_idx[ x0 ][ y0 ] | ue(v) \| ae(v) |
| } else { | |
| if( slice_type == B ) { | |
| if( !entropy_coding_mode_flag ) { | |
| combined_inter_pred_ref_idx | ue(v) |
| if( combined_inter_pred_ref_idx == MaxPredRef ) | |
| inter_pred_flag[ x0 ][ y0 ] | ue(v) |
| } else | |
| inter_pred_flag[ x0 ][ y0 ] | ue(v) \| ae(v) |
| } | |
| if( inter_pred_flag[ x0 ][ y0 ] == Pred_LC ) { | |
| if( num_ref_idx_lc_active_minus1 > 0 ) { | |
| if( !entropy_coding_mode_flag ) { | |
| if( combined_inter_pred_ref_idx == MaxPredRef ) | |
| ref_idx_lc_minus4[ x0 ][ y0 ] | ue(v) |
| } else | |
| ref_idx_lc[ x0 ][ y0 ] | ae(v) |
| } | |
| mvd_lc[ x0 ][ y0 ][ 0 ] | se(v) \| ae(v) |
| mvd_lc[ x0 ][ y0 ][ 1 ] | se(v) \| ae(v) |
| mvp_idx_lc[ x0 ][ y0 ] | ue(v) \| ae(v) |
| } | |
| else { /* Pred_L0 or Pred_BI */ | |
| if( num_ref_idx_l0_active_minus1 > 0 ) { | |
| if( !entropy_coding_mode_flag ) { | |
| if( combined_inter_pred_ref_idx == MaxPredRef ) | |
| ref_idx_l0_minusX[ x0 ][ y0 ] | ue(v) |
| } else | |
| ref_idx_l0_minusX[ x0 ][ y0 ] | ue(v) \| ae(v) |
| } | |
| mvd_l0[ x0 ][ y0 ][ 0 ] | se(v) \| ae(v) |
| mvd_l0[ x0 ][ y0 ][ 1 ] | se(v) \| ae(v) |

FIG. 13C

| | |
|---|---|
| mvp_idx_l0[ x0 ][ y0 ] | ue(v) \| ae(v) |
| } | |
| if( inter_pred_flag[ x0 ][ y0 ] = = Pred_BI ) { | |
| if( num_ref_idx_l1_active_minus1 > 0 ) { | |
| if( !entropy_coding_mode_flag ) { | |
| if( combined_inter_pred_ref_idx == MaxPredRef ) | |
| ref_idx_l1_minusX[ x0 ][ y0 ] | ue(v) |
| } else | |
| ref_idx_l1[ x0 ][ y0 ] | ue(v) \|ae(v) |
| } | |
| mvd_l1[ x0 ][ y0 ][ 0 ] | se(v) \| ae(v) |
| mvd_l1[ x0 ][ y0 ][ 1 ] | se(v) \| ae(v) |
| mvp_idx_l1[ x0 ][ y0 ] | ue(v) \| ae(v) |
| } | |
| } | |
| } | |
| } | | subsequent_pcm_num specifies the number of subsequent I-PCM coding units associated with the current log2CUSize that successively follow the current I-PCM coding unit. The value subsequent_pcm_num shall be in the range of 0 to 3, inclusive. When the subsequent_pcm_num is not present, it shall be inferred to be 0.

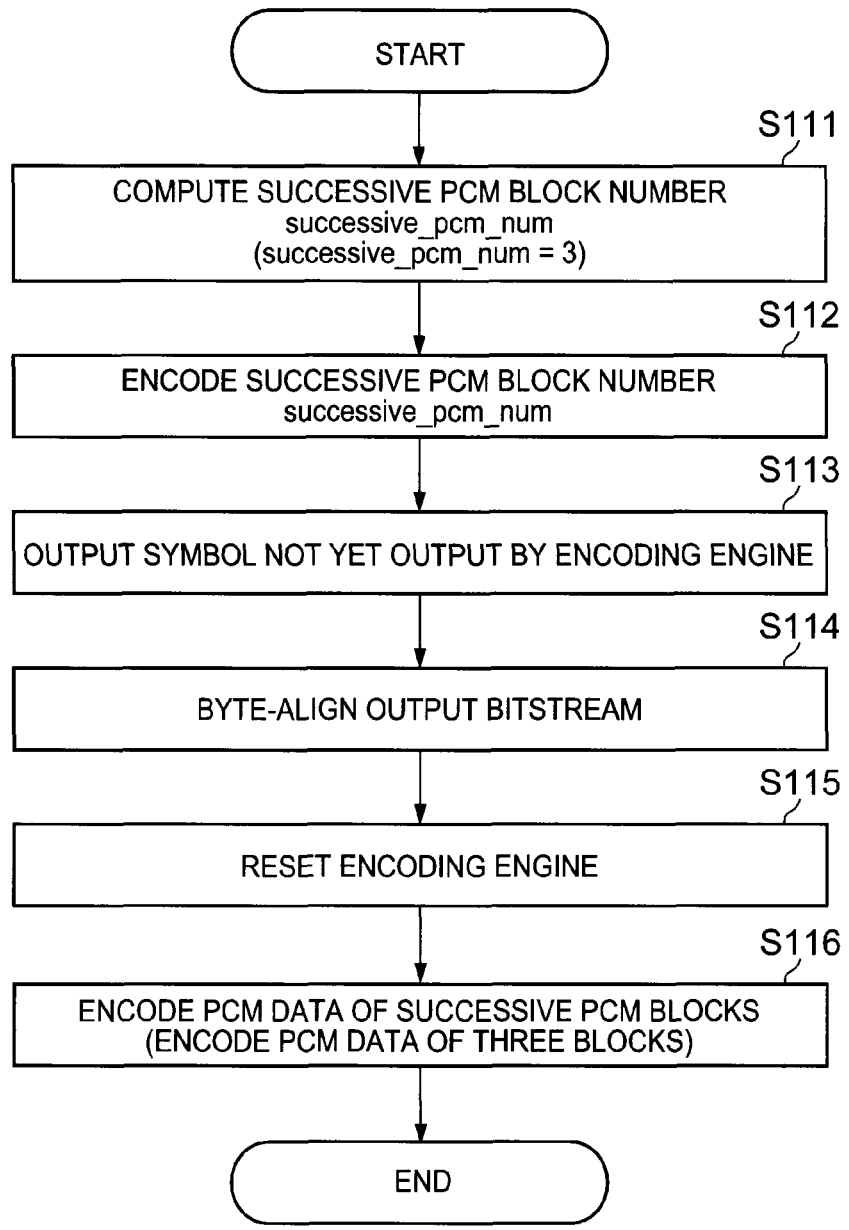

FIG. 15

(7.3.4 Slice data syntax)

| slice_data( ) { | Descriptor |
|---|---|
|    CurrTbAddr = LCUAddress | |
|    moreDataFlag = 1 | |
|    if( adaptive_loop_filter_flag && alf_cu_control_flag ) | |
|       AlfCuFlagIdx = -1 | |
|    do { | |
|       xCU = HorLumaLocation( CurrTbAddr ) | |
|       yCU = VerLumaLocation( CurrTbAddr ) | |
|       *NumPCMBlock = 0* | |
|       moreDataFlag = coding_tree( xCU, yCU, Log2TbSize ) | |
|       CurrTbAddr = NextTbAddress( CurrTbAddr ) | |
|    } while( moreDataFlag ) | |
| } | |

FIG. 16A (7.3.5 Coding tree syntax)

| coding_tree( x0, y0, log2CUSize ) { | Descriptor |
|---|---|
|   if( x0 + ( 1 << log2CUSize ) <= PicWidthInSamples$_L$ && <br>     y0 + ( 1 << log2CUSize ) <= PicHeightInSamples$_L$ && <br>     cuAddress( x0, y0 ) >= SliceAddress <br>     *NumPCMBlock == 0 ) {* | |
|     if( !entropy_coding_mode_flag && slice_type != I ) | |
|       cu_split_pred_part_mode[ x0 ][ y0 ] | ce(v) |
|     else if( log2CUSize > Log2MinCUSize ) | |
|       split_coding_unit_flag[ x0 ][ y0 ] | u(1) \| ae(v) |
|   } | |
|   if( adaptive_loop_filter_flag && alf_cu_control_flag ) { | |
|     cuDepth = Log2MaxCUSize – log2CUSize | |
|     if( cuDepth <= alf_cu_control_max_depth ) | |
|       if( cuDepth == alf_cu_control_max_depth \|\| | |
|         split_coding_unit_flag[ x0 ][ y0 ] == 0 ) | |
|         AlfCuFlagIdx++ | |
|   } | |
|   if( split_coding_unit_flag[ x0 ][ y0 ] ) { | |
|     if( cu_qp_depta_enabled_flag && <br>       log2CUSize == log2MinCUDQPSize ) | |
|       IsCuQpDeltaCoded = 0 | |
|     x1 = x0 + ( ( 1 << log2CUSize ) >> 1 ) | |
|     y1 = y0 + ( ( 1 << log2CUSize ) >> 1 ) | |
|     if( cuAddress( x1, y0 ) > SliceAddress ) | |
|       moreDataFlag = coding_tree( x0, y0, log2CUSize – 1 ) | |
|     if( cuAddress( x0, y1 ) > SliceAddress && moreDataFlag && <br>       x1 < PicWidthInSamples$_L$ ) | |
|       moreDataFlag = coding_tree( x1, y0, log2CUSize – 1 ) | |
|     if( cuAddress( x1, y1 ) > SliceAddress && moreDataFlag && <br>       y1 < PicHeightInSamples$_L$ ) | |
|       moreDataFlag = coding_tree( x0, y1, log2CUSize – 1 ) | |
|     if( moreDataFlag && <br>       x1 < PicWidthInSamples$_L$ && y1 < PicHeightInSamples$_L$ ) | |
|       moreDataFlag = coding_tree( x1, y1, log2CUSize – 1 ) | |
|   } else { | |
|     if(adaptive_loop_filter_flag && alf_cu_control_flag ) | |

FIG. 16B

| | |
|---|---|
| AlfCuFlag[ x0 ][ y0 ] = alf_cu_flag[ AlfCuFlagIdx ] | |
| *if(NumPCMBlock == 0)* | |
|    coding_unit( x0, y0, log2CUSize ) | |
| *else* | |
|    *NumPCMBlock--* | |
| *if(NumPCMBlock == 0) {* | |
|    if( !entropy_coding_mode_flag ) | |
|      moreDataFlag = more_rbsp_data( ) | |
|    else { | |
|      if( granularity_block_boundary( x0, y0, log2CUSize ) ) { | |
|        end_of_slice_flag | ae(v) |
|        moreDataFlag = !end_of_slice_flag | |
|      } else | |
|        moreDataFlag = 1 | |
|    } | |
| *}* | |
|    *else* | |
|      *moreDataFlag = 1* | |
| } | |
| return moreDataFlag | |
| } | |

FIG. 17A (7.3.6 Coding unit syntax)

| coding_unit( x0, y0, log2CUSize ) { | Descriptor |
|---|---|
| if( entropy_coding_mode_flag && slice_type != I ) | |
| skip_flag[ x0 ][ y0 ] | u(1) \| ae(v) |
| if( skip_flag[ x0 ][ y0 ] ) | |
| prediction_unit( x0, y0 ) | |
| else { | |
| if( !entropy_coding_mode_flag ) { | |
| if( slice_type == I && log2CUSize == Log2MinCUSize ) | |
| intra_part_mode | u(1) |
| } else if( slice_type != I \|\| log2CUSize == Log2MinCUSize ) | |
| pred_type | u(v) \| ae(v) |
| x1 = x0 + ( ( 1 << log2CUSize ) >> 1 ) | |
| y1 = y0 + ( ( 1 << log2CUSize ) >> 1 ) | |
| x2 = x1 - ( ( 1 << log2CUSize ) >> 2 ) | |
| y2 = y1 - ( ( 1 << log2CUSize ) >> 2 ) | |
| x3 = x1 + ( ( 1 << log2CUSize ) >> 2 ) | |
| y3 = y1 + ( ( 1 << log2CUSize ) >> 2 ) | |
| if( PartMode == PART_2Nx2N ) { | |
| prediction_unit( x0, y0, log2CUSize ) | |
| } else if( PartMode == PART_2NxN ) { | |
| prediction_unit( x0, y0, log2CUSize ) | |
| prediction_unit( x0, y1, log2CUSize ) | |
| } else if( PartMode == PART_Nx2N ) { | |
| prediction_unit( x0, y0, log2CUSize ) | |
| prediction_unit( x1, y0, log2CUSize ) | |
| } else if( PartMode == PART_2NxnU ) { | |
| prediction_unit( x0, y0, log2CUSize ) | |
| prediction_unit( x0, y2, log2CUSize ) | |
| } else if( PartMode == PART_2NxnD ) { | |
| prediction_unit( x0, y0, log2CUSize ) | |
| prediction_unit( x0, y3, log2CUSize ) | |
| } else if( PartMode == PART_nLx2N ) { | |
| prediction_unit( x0, y0, log2CUSize ) | |
| prediction_unit( x2, y0, log2CUSize ) | |
| } else if( PartMode == PART_nRx2N ) { | |
| prediction_unit( x0, y0, log2CUSize ) | |

FIG. 17B

| | |
|---|---|
|     prediction_unit( x3, y0, log2CUSize ) | |
| } else { /* PART_NxN */ | |
|     prediction_unit( x0, y0, log2CUSize ) | |
|     prediction_unit( x1, y0, log2CUSize ) | |
|     prediction_unit( x0, y1, log2CUSize ) | |
|     prediction_unit( x1, y1, log2CUSize ) | |
|     } | |
| } | |
| if( !pcm_flag ) { | |
|     transform_tree( x0, y0, log2CUSize, log2CUSize, 0, 0 ) | |
|     transform_coeff( x0, y0, log2CUSize, log2CUSize, 0, 0 ) | |
|     transform_coeff( x0, y0, log2CUSize, log2CUSize, 0, 1 ) | |
|     transform_coeff( x0, y0, log2CUSize, log2CUSize, 0, 2 ) | |
| } | |
| } | |

FIG. 18A (7.3.7 Prediction unit syntax)

| prediction_unit( x0, y0, log2CUSize ) { | Descriptor |
|---|---|
| if( skip_flag[ x0 ][ y0 ] ) { | |
|     merge_idx[ x0 ][ y0 ] | ue(v) \| ae(v) |
| } else if( PredMode = = MODE_INTRA ) { | |
|     if( PartMode == PART_2Nx2N && <br>         log2CUSize >= Log2MinIPCMCUSize ) | |
|     *successive_pcm_num* | u(v) \| ae(v) |
|     if( *successive_pcm_num* ) { | |
|       *NumPCMBlock=successive_pcm_num* | |
|       while ( !byte_aligned( ) ) | |
|         pcm_alignment_zero_bit | u(v) |
|       *for(j = 0; j < NumPCMBlock; j++ ){* | |
|         for( i = 0; i < 1 << ( log2CUSize << 1 ); i++ ) | |
|           pcm_sample_luma[ i ] | u(v) |
|         for( i = 0; i < ( 1 << ( log2CUSize << 1 ) ) >> 1; i++ ) | |
|           pcm_sample_chroma[ i ] | u(v) |
|       } | |
|     *NumPCMBlock--* | |
|     } else { | |
|       prev_intra_luma_pred_flag[ x0 ][ y0 ] | u(1) \| ae(v) |
|       if( prev_intra_luma_pred_flag[ x0 ][ y0 ] ) | |
|         if( NumMPMCand > 1 ) | |
|           mpm_idx[ x0 ][ y0 ] | u(1) \| ae(v) |
|       else | |
|         rem_intra_luma_pred_mode[ x0 ][ y0 ] | ce(v) \| ae(v) |
|       if( IntraPredMode[ x0 ][ y0 ] == 2 ) | |
|         planar_flag_luma[ x0 ][ y0 ] | u(1) \| ae(v) |
|       intra_chroma_pred_mode[ x0 ][ y0 ] | ue(v) \| ae(v) |
|       SignaledAsChromaDC = <br>         ( chroma_pred_from_luma_enabled_flag ? <br>           intra_chroma_pred_mode[ x0 ][ y0 ] == 3 : <br>           intra_chroma_pred_mode[ x0 ][ y0 ] == 2 ) | |
|       if( IntraPredMode[ x0 ][ y0 ] != 2 && <br>         IntraPredMode[ x0 ][ y0 ]!=34 && SignaledAsChromaDC ) | |
|         planar_flag_chroma[ x0 ][ y0 ] | u(1) \| ae(v) |
|     } | |

FIG. 18B

| | |
|---|---|
| } else { /* MODE_INTER */ | |
| if( entropy_coding_mode_flag \|\| PartMode != PART_2Nx2N ) | |
|     merge_flag[ x0 ][ y0 ] | u(1) \| ae(v) |
| if( merge_flag[ x0 ][ y0 ] ) { | |
|     merge_idx[ x0 ][ y0 ] | ue(v) \| ae(v) |
| } else { | |
|     if( slice_type = = B ) { | |
|       if( !entropy_coding_mode_flag ) { | |
|         combined_inter_pred_ref_idx | ue(v) |
|         if( combined_inter_pred_ref_idx == MaxPredRef ) | |
|           inter_pred_flag[ x0 ][ y0 ] | ue(v) |
|       } else | |
|         inter_pred_flag[ x0 ][ y0 ] | ue(v) \| ae(v) |
|     } | |
|     if( inter_pred_flag[ x0 ][ y0 ] = = Pred_LC ) { | |
|       if( num_ref_idx_lc_active_minus1 > 0 ) { | |
|         if( !entropy_coding_mode_flag ) { | |
|           if( combined_inter_pred_ref_idx == MaxPredRef ) | |
|             ref_idx_lc_minus4[ x0 ][ y0 ] | ue(v) |
|         } else | |
|           ref_idx_lc[ x0 ][ y0 ] | ae(v) |
|       } | |
|       mvd_lc[ x0 ][ y0 ][ 0 ] | se(v) \| ae(v) |
|       mvd_lc[ x0 ][ y0 ][ 1 ] | se(v) \| ae(v) |
|       mvp_idx_lc[ x0 ][ y0 ] | ue(v) \| ae(v) |
|     } | |
|     else { /* Pred_L0 or Pred_BI */ | |
|       if( num_ref_idx_l0_active_minus1 > 0 ) { | |
|         if( !entropy_coding_mode_flag ) { | |
|           if( combined_inter_pred_ref_idx == MaxPredRef ) | |
|             ref_idx_l0_minusX[ x0 ][ y0 ] | ue(v) |
|         } else | |
|           ref_idx_l0_minusX[ x0 ][ y0 ] | ue(v) \| ae(v) |
|       } | |
|       mvd_l0[ x0 ][ y0 ][ 0 ] | se(v) \| ae(v) |
|       mvd_l0[ x0 ][ y0 ][ 1 ] | se(v) \| ae(v) |
|       mvp_idx_l0[ x0 ][ y0 ] | ue(v) \| ae(v) |

FIG. 18C

| | |
|---|---|
| } | |
| if( inter_pred_flag[ x0 ][ y0 ] == Pred_BI ) { | |
| if( num_ref_idx_l1_active_minus1 > 0 ) { | |
| if( !entropy_coding_mode_flag ) { | |
| if( combined_inter_pred_ref_idx == MaxPredRef ) | |
| ref_idx_l1_minusX[ x0 ][ y0 ] | ue(v) |
| } else | |
| ref_idx_l1[ x0 ][ y0 ] | ue(v) \| ae(v) |
| } | |
| mvd_l1[ x0 ][ y0 ][ 0 ] | se(v) \| ae(v) |
| mvd_l1[ x0 ][ y0 ][ 1 ] | se(v) \| ae(v) |
| mvp_idx_l1[ x0 ][ y0 ] | ue(v) \| ae(v) |
| } | |
| } | |
| } | |
| } | | successive_pcm_num specifies the number of successive I-PCM coding units associated with the current log2CUSize. The value successive_pcm_num shall be in the range of 0 to 4, inclusive. When the successive_pcm_num is not present, it shall be inferred to be 0.

| successive_pcm_num | binary representation | | | |
|---|---|---|---|---|
| | 1st | 2nd | 3rd | 4th |
| 0 | 0 | | | |
| 1 | 1 | 0 | | |
| 2 | 1 | 1 | 0 | |
| 3 | 1 | 1 | 1 | 0 |
| 4 | 1 | 1 | 1 | 1 |

(BINARY REPRESENTATION OF successive_pcm_num SYNTAX FOR CABAC)
(NOT ADAPTIVE TO QUAD-TREE BLOCK POSITION)

(B)

| successive_pcm_num | variable length code |
|---|---|
| 0 | 0 |
| 1 | 10 |
| 2 | 110 |
| 3 | 1110 |
| 4 | 1111 |

(VARIABLE LENGTH CODE OF successive_pcm_num SYNTAX FOR CAVLC)
(NOT ADAPTIVE TO Quad-tree BLOCK POSITION)

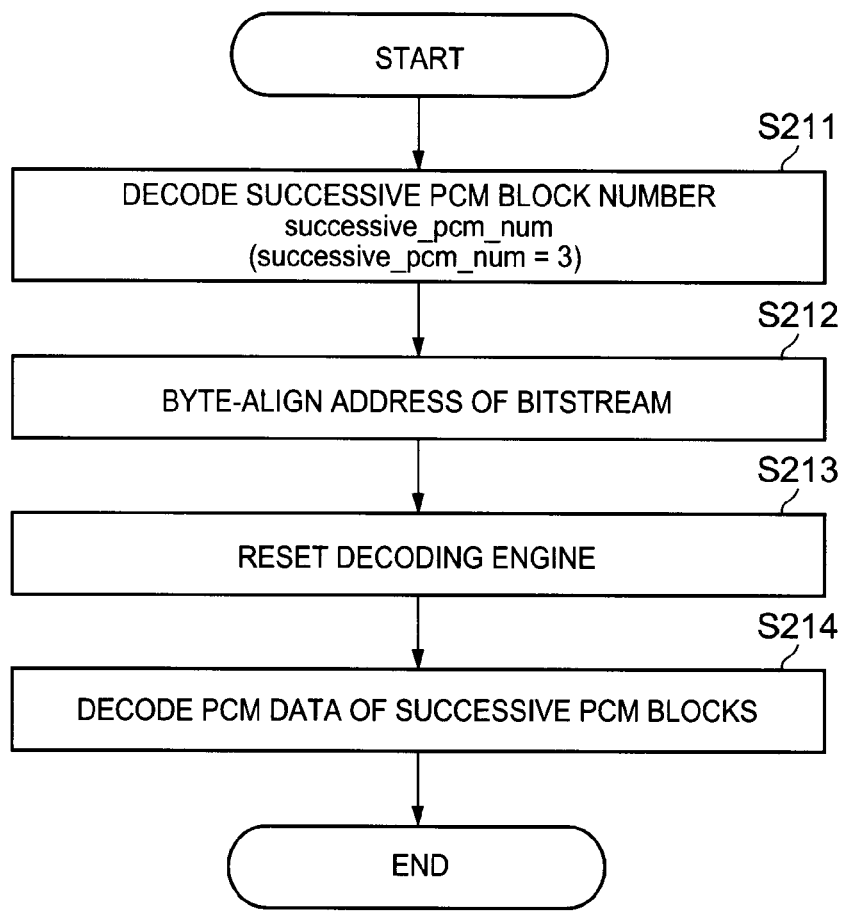

| subsequent_pcm_num | binary representation | | | | | | | | | | | |
|---|---|---|---|---|---|---|---|---|---|---|---|---|
| | block 0 | | | block 1 | | | block 2 | | | block 3 | | |
| | 1st | 2nd | 3rd | 1st | 2nd | 3rd | 1st | 2nd | 3rd | 1st | 2nd | 3rd |
| 0 | 0 | | | 0 | | | 0 | | | NA | | |
| 1 | 1 | 0 | | 1 | 0 | | 1 | | | NA | | |
| 2 | 1 | 1 | 0 | 1 | 1 | | NA | | | NA | | |
| 3 | 1 | 1 | 1 | NA | | | NA | | | NA | | |

(BINARY REPRESENTATION OF subsequent_pcm_num SYNTAX FOR CABAC)
( ADAPTIVE TO Quad-tree BLOCK POSITION)

(B)

| subsequent_pcm_num | variable length code | | | |
|---|---|---|---|---|
| | block 0 | block 1 | block 2 | block 3 |
| 0 | 0 | 0 | 0 | NA |
| 1 | 10 | 010 | 1 | NA |
| 2 | 110 | 011 | NA | NA |
| 3 | 111 | NA | NA | NA |

(VARIABLE LENGTH CODE OF subsequent_pcm_num SYNTAX FOR CAVLC)
( ADAPTIVE TO Quad-tree BLOCK POSITION)

| successive_pcm_num | binary representation ||||||||||||||||
|---|---|---|---|---|---|---|---|---|---|---|---|---|---|---|---|---|
| | block 0 |||| block 1 |||| block 2 |||| block 3 ||||
| | 1st | 2nd | 3rd | 4th | 1st | 2nd | 3rd | 4th | 1st | 2nd | 3rd | 4th | 1st | 2nd | 3rd | 4th |
| 0 | 0 | | | | 0 | | | | 0 | | | | 0 | | | |
| 1 | 1 | 0 | | | 1 | 0 | | | 1 | 0 | | | 1 | | | |
| 2 | 1 | 1 | 0 | | 1 | 1 | 0 | | 1 | 1 | | | NA | | | |
| 3 | 1 | 1 | 1 | 0 | 1 | 1 | 1 | | NA | | | | NA | | | |
| 4 | 1 | 1 | 1 | 1 | NA | | | | NA | | | | NA | | | |

(BINARY REPRESENTATION OF successive_pcm_num SYNTAX FOR CABAC)
(ADAPTIVE TO Quad-tree BLOCK POSITION)

(B)

| successive_pcm_num | variable length code ||||
|---|---|---|---|---|
| | block 0 | block 1 | block 2 | block 3 |
| 0 | 0 | 0 | 0 | NA |
| 1 | 10 | 010 | 1 | NA |
| 2 | 110 | 011 | NA | NA |
| 3 | 111 | NA | NA | NA |

(VARIABLE LENGTH CODE OF successive_pcm_num SYNTAX FOR CAVLC)
(ADAPTIVE TO Quad-tree BLOCK POSITION)

VIDEO ENCODING DEVICE, VIDEO DECODING DEVICE, VIDEO ENCODING METHOD, VIDEO DECODING METHOD, AND PROGRAM

CROSS-REFERENCE TO RELATED PATENT APPLICATIONS

This application is a National Stage Entry of International Application No. PCT/JP2012/006852, filed Oct. 25, 2012, which claims priority from Japanese Patent Application Nos. 2011-240538, filed Nov. 1, 2011 and 2012-085821, filed Apr. 4, 2012. The entire contents of the above-referenced applications are expressly incorporated herein by reference.

TECHNICAL FIELD

The present invention relates to a video encoding device and a video decoding device that use PCM encoding.

BACKGROUND ART

Non Patent Literature (NPL) 1 discloses a general-purpose video encoding technique based on a transform encoding technique, a prediction encoding technique, and an entropy encoding technique.

An example of a block type that is not subject to a transform process and an entropy encoding process is pulse code modulation (PCM). The term "block type" means a type of encoding (intra prediction, inter prediction, PCM) used for a block.

A video encoding device described in NPL 1 has a structure depicted in FIG. 25. The video encoding device depicted in FIG. 25 is hereafter referred to as "typical video encoding device".

The structure and operation of the typical video encoding device that receives each frame of digitized video as input and outputs a bitstream are described below, with reference to FIG. 25.

The video encoding device depicted in FIG. 25 includes a transformer/quantizer 102, an entropy encoder 103, an inverse transformer/inverse quantizer 104, a buffer 105, a predictor 106, a PCM encoder 107, a PCM decoder 108, a multiplexed data selector 109, a multiplexer 110, a switch 121, and a switch 122.

As depicted in FIG. 26, each frame includes largest coding units (LCUs), and each LCU includes coding units (CUs).

The video encoding device depicted in FIG. 25 encodes the LCUs in raster scan order, and the CUs included in each LCU in z-scan order. In detail, the CUs are encoded in order of "upper left block→upper right block→lower left block→lower right block". The CU size is any of 64×64, 32×32, 16×16, and 8×8. The smallest CU is referred to as "smallest coding unit (SCU)".

A prediction signal supplied from the predictor 106 is subtracted from input video of a CU, and the result is input to the transformer/quantizer 102. There are two types of prediction signal, namely, an intra prediction signal and an inter-frame prediction signal. Each of the prediction signals is described below. The intra prediction signal is a prediction signal created based on an image of a reconstructed picture that has the same display time as a current picture and is stored in the buffer 105. A CU encoded using the intra prediction signal is hereafter referred to as "intra CU".

The inter-frame prediction signal is a prediction signal created from an image of a reconstructed picture that has a different display time from the current picture and is stored in the buffer 105. A CU encoded using the inter-frame prediction signal is hereafter referred to as "inter CU".

FIG. 27 is an explanatory diagram depicting an example of inter-frame prediction using a 16×16 CU (specifically, a 2N×2N prediction unit (PU) of a 16×16 CU). A motion vector $MV=(mv_x, mv_y)$ depicted in FIG. 27 is a prediction parameter of inter-frame prediction, which indicates the amount of translation of an inter-frame prediction block (inter-frame prediction signal) of a reference picture relative to a block to be encoded.

A picture encoded including only intra CUs is called "I picture". A picture encoded including not only intra CUs but also inter CUs is called "P picture". A picture encoded including inter CUs that use not only one reference picture but two reference pictures simultaneously for inter-frame prediction is called "B picture".

The transformer/quantizer 102 frequency-transforms the image (prediction error image) from which the prediction signal has been subtracted, to obtain a frequency transform coefficient of the prediction error image.

The transformer/quantizer 102 further quantizes the frequency transform coefficient with a predetermined quantization step width Qs. The quantized frequency transform coefficient is hereafter referred to as "transform quantization value" or "quantization level".

The entropy encoder 103 entropy-encodes prediction parameters and the transform quantization value. The prediction parameters are information related to the prediction of the CU and the PU included in the CU, such as the above-mentioned CU block type (intra prediction, inter prediction, PCM), motion vector, and the like.

The inverse transformer/inverse quantizer 104 inverse-quantizes the transform quantization value with the quantization step width Qs. The inverse transformer/inverse quantizer 104 further inverse-frequency-transforms the frequency transform coefficient obtained by the inverse quantization. The prediction signal is added to the reconstructed prediction error image obtained by the inverse frequency transform, and the result is supplied to the switch 122.

The multiplexed data selector 109 monitors the amount of input data of the entropy encoder 103 corresponding to the CU to be encoded. In the case where the entropy encoder 103 is capable of entropy-encoding the input data within the processing time of the CU, the multiplexed data selector 109 selects the output data of the entropy encoder 103, and supplies the output data to the multiplexer 110 via the switch 121. The multiplexed data selector 109 further selects the output data of the inverse transformer/inverse quantizer 104, and supplies the output data to the buffer 105 via the switch 122.

In the case where the entropy encoder 103 is not capable of entropy-encoding the input data within the processing time of the CU, the multiplexed data selector 109 selects the output data of the PCM encoder 107, and supplies the output data to the multiplexer 110 via the switch 121. The multiplexed data selector 109 further selects the output data of the PCM decoder 108 obtained by PCM-decoding the output data of the PCM encoder 107, and supplies the output data to the buffer 105 via the switch 122.

The buffer 105 stores the reconstructed image supplied via the switch 122. The reconstructed image per frame is referred to as "reconstructed picture".

The multiplexer 110 multiplexes the output data of the entropy encoder 103 and the output data of the PCM encoder 107, and outputs the multiplexing result.

Based on the operation described above, the multiplexer 110 in the video encoding device creates the bitstream.

CITATION LIST

Non Patent Literature

NPL 1: Benjamin Bross, Woo-Jin Han, Jens-Rainer Ohm, Gary J. Sullivan, and Thomas Wiegand, "WD4: Working Draft 4 of High-Efficiency Video Coding", JCTVC-F803_d1, Joint Collaborative Team on Video Coding (JCT-VC) of ITU-T SG16 WP3 and ISO/IEC JTC1/SC29/WG11 6th Meeting: Torino, IT, 14-22 Jul. 2011.

SUMMARY OF INVENTION

Technical Problem

In the video encoding device depicted in FIG. 25, when encoding a CU in the PCM mode, the following three processes are needed after entropy-encoding a PCM block header (pcm_flag syntax in 7.3.7 Prediction unit syntax) of the CU: a process of outputting a not yet output symbol by an encoding engine of the entropy encoder 103; a process of byte-aligning the output data; and a process of resetting the encoding engine. The output data byte alignment process causes output of redundant bits. The not-yet-output symbol output process and the encoding engine reset process cause consumption of computer resources.

The output of redundant bits is described below, with reference to FIG. 28. Suppose there are four CUs (hereafter referred to as "blocks") to be encoded, and block 0 is a block (intra prediction or inter prediction) to be entropy-encoded and blocks 1 to 3 are each a block (PCM block) to be PCM-encoded, as depicted in (A) in FIG. 28. The bitstream output from the multiplexer 110 includes a video bitstream of entropy-encoded block 0 and a PCM block header, alignment data, and PCM data of each of blocks 1 to 3, as depicted in (B) in FIG. 28.

The alignment data occurs each time a termination process is executed. In the conventional technique, when the PCM mode occurs successively (especially when the PCM mode occurs successively for blocks of small block size), the entropy encoding termination process occurs successively, and increased alignment data causes compression performance degradation.

Besides, for the PCM blocks of blocks 1 to 3 depicted in (A) in FIG. 28, the not-yet-output symbol output process and the encoding engine reset process are repeatedly performed in succession, which consumes computer resources.

As described above, when successive PCM blocks occur, the entropy encoding termination process occurs successively. This causes compression performance degradation and compression efficiency degradation. Compression performance degradation and compression efficiency degradation are significant especially in the case where the block size is small.

The present invention has an object of providing a video encoding device, a video decoding device, a video encoding method, a video decoding method, a video encoding program, and a video decoding program that prevent compression performance degradation and compression efficiency degradation even when successive PCM blocks occur.

Solution to Problem

A video encoding device according to the present invention includes: transform means for transforming an image block; entropy encoding means for entropy-encoding transformed data of the image block transformed by the transform means; PCM encoding means for PCM-encoding an image block; multiplexed data selection means for selecting output data of the entropy encoding means or output data of the PCM encoding means, for each block of an externally set block size; multiplexing means for embedding a PCM header into a bitstream, in a block of the externally set block size; embedding means for embedding the number of successive PCM-encoded blocks, into the PCM header; and means for multiplexing PCM data for the number of successive PCM-encoded blocks, into the bitstream.

A video decoding device according to the present invention includes: de-multiplexing means for de-multiplexing a bitstream including the number of successive PCM-encoded blocks; PCM decoding means for successively reading PCM data for the number of successive PCM-encoded blocks from the bitstream, and PCM-decoding the PCM data; and entropy decoding means for entropy-decoding transformed data of an image included in the bitstream.

A video encoding method according to the present invention includes: embedding the number of successive PCM-encoded blocks, into a PCM header; embedding the PCM header into a bitstream, in a block of an externally set block size; and multiplexing PCM data for the number of successive PCM-encoded blocks, into the bitstream.

A video decoding method according to the present invention includes: de-multiplexing a bitstream including the number of successive PCM-encoded blocks; successively reading PCM data for the number of successive PCM-encoded blocks from the bitstream, and PCM-decoding the PCM data; and entropy-decoding transformed data of an image included in the bitstream.

A video encoding program according to the present invention causes a computer to execute: a process of embedding the number of successive PCM-encoded blocks, into a PCM header; a process of embedding the PCM header into a bitstream, in a block of an externally set block size; and a process of multiplexing PCM data for the number of successive PCM-encoded blocks, into the bitstream.

A video decoding program according to the present invention causes a computer to execute: a process of de-multiplexing a bitstream including the number of successive PCM-encoded blocks; a process of successively reading PCM data for the number of successive PCM-encoded blocks from the bitstream, and PCM-decoding the PCM data; and a process of entropy-decoding transformed data of an image included in the bitstream.

Advantageous Effects of Invention

According to the present invention, compression performance degradation and compression efficiency degradation can be prevented even when successive PCM blocks occur.

BRIEF DESCRIPTION OF DRAWINGS

FIG. 2 It is a flowchart depicting an operation of the video encoding device in Exemplary Embodiment 1.

FIG. 3A It is an explanatory diagram of list 1 indicating Coding tree syntax.

FIG. 3B It is an explanatory diagram of list 1 indicating Coding tree syntax.

FIG. 4A It is an explanatory diagram of list 2 indicating Coding unit syntax.

FIG. 4B It is an explanatory diagram of list 2 indicating Coding unit syntax.

FIG. 5A It is an explanatory diagram of list 3 indicating Prediction unit syntax.

FIG. 5B It is an explanatory diagram of list 3 indicating Prediction unit syntax.

FIG. 5C It is an explanatory diagram of list 3 indicating Prediction unit syntax.

FIG. 6 It is an explanatory diagram of an example of a code of subsequent_pcm_num.

FIG. 10 It is an explanatory diagram of list 4 indicating Slice data syntax.

FIG. 11A It is an explanatory diagram of list 5 indicating Coding tree syntax.

FIG. 11B It is an explanatory diagram of list 5 indicating Coding tree syntax.

FIG. 12A It is an explanatory diagram of list 6 indicating Coding unit syntax.

FIG. 12B It is an explanatory diagram of list 6 indicating Coding unit syntax.

FIG. 13A It is an explanatory diagram of list 7 indicating Prediction unit syntax.

FIG. 13B It is an explanatory diagram of list 7 indicating Prediction unit syntax.

FIG. 13C It is an explanatory diagram of list 7 indicating Prediction unit syntax.

FIG. 14 It is a flowchart depicting an operation of a video encoding device in Exemplary Embodiment 4.

FIG. 15 It is an explanatory diagram of list 8 indicating Slice data syntax.

FIG. 16A It is an explanatory diagram of list 9 indicating Coding tree syntax.

FIG. 16B It is an explanatory diagram of list 9 indicating Coding tree syntax.

FIG. 17A It is an explanatory diagram of list 10 indicating Coding unit syntax.

FIG. 17B It is an explanatory diagram of list 10 indicating Coding unit syntax.

FIG. 18A It is an explanatory diagram of list 11 indicating Prediction unit syntax.

FIG. 18B It is an explanatory diagram of list 11 indicating Prediction unit syntax.

FIG. 18C It is an explanatory diagram of list 11 indicating Prediction unit syntax.

FIG. 19 It is an explanatory diagram of an example of a code of successive_pcm_num.

FIG. 21 It is a flowchart depicting an operation of a video decoding device in Exemplary Embodiment 4.

FIG. 22 It is an explanatory diagram of another example of a code of subsequent_pcm_num syntax.

FIG. 23 It is an explanatory diagram of another example of a code of successive_pcm_num.

DESCRIPTION OF EMBODIMENTS

Exemplary Embodiment 1

Figure 1:
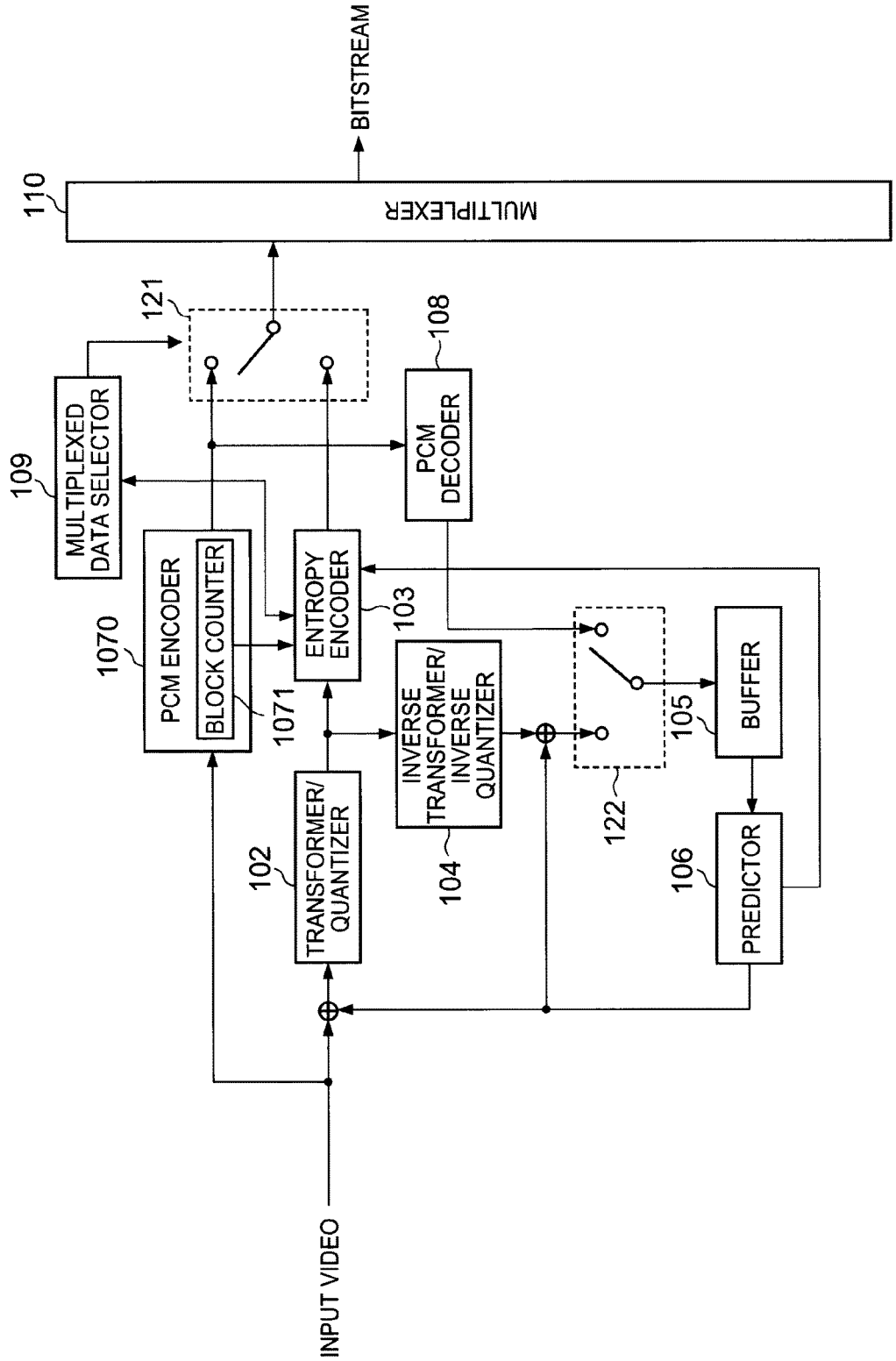
FIG. 1 It is a block diagram depicting a video encoding device in Exemplary Embodiment 1.
Figure 25:
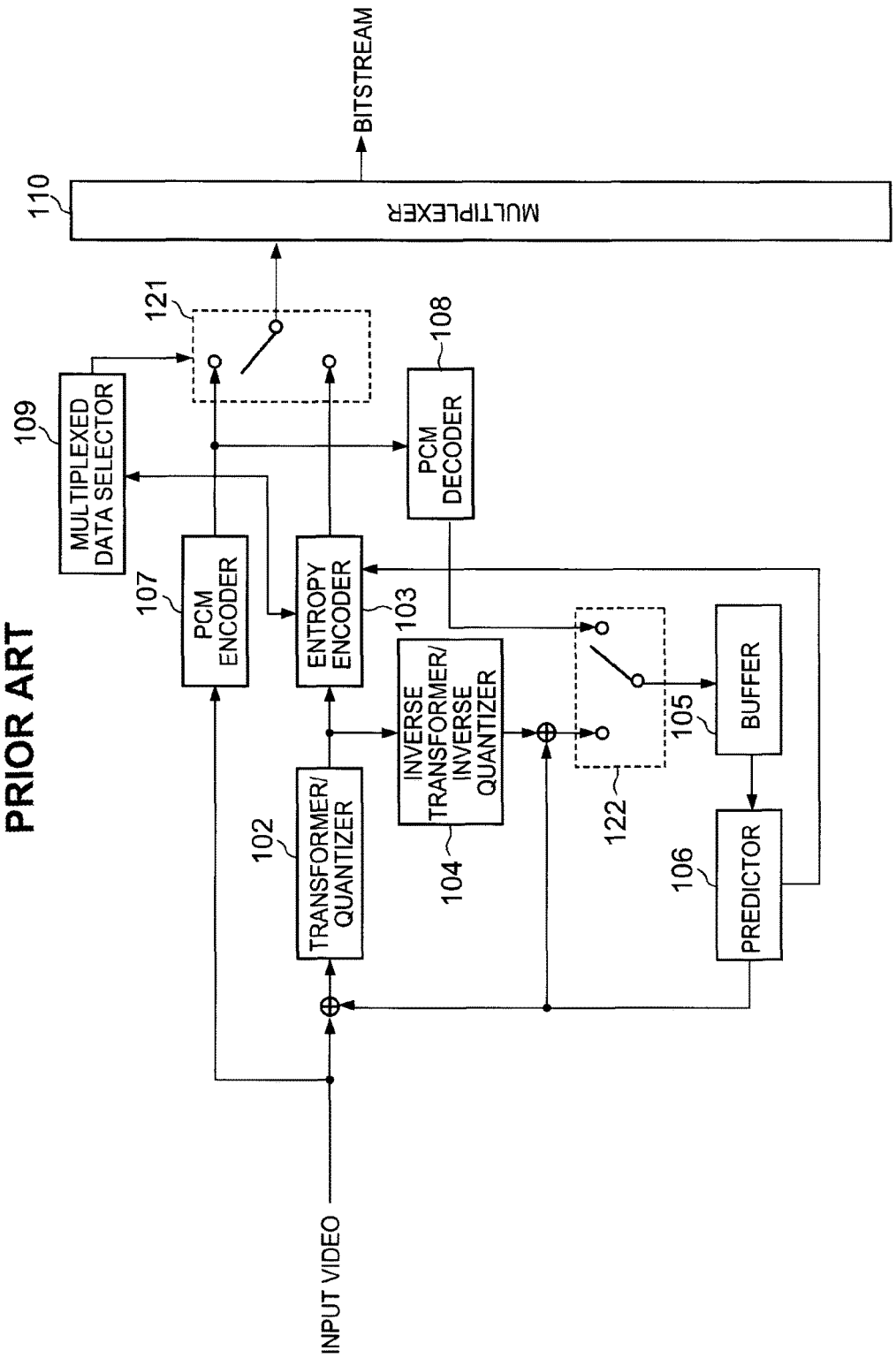
FIG. 25 It is a block diagram of a typical video encoding device.
Figure 26:
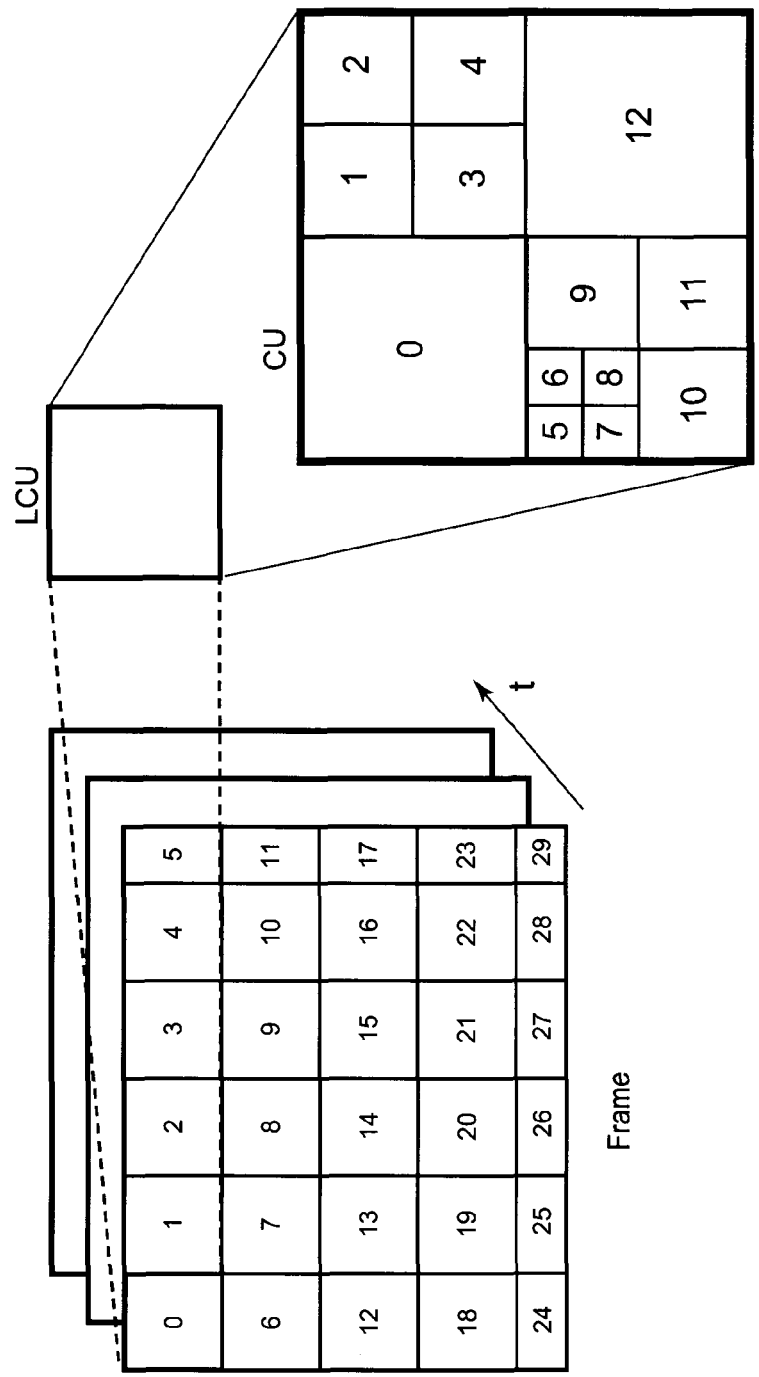
FIG. 26 It is an explanatory diagram depicting an example of a structure of a frame.
Figure 27:
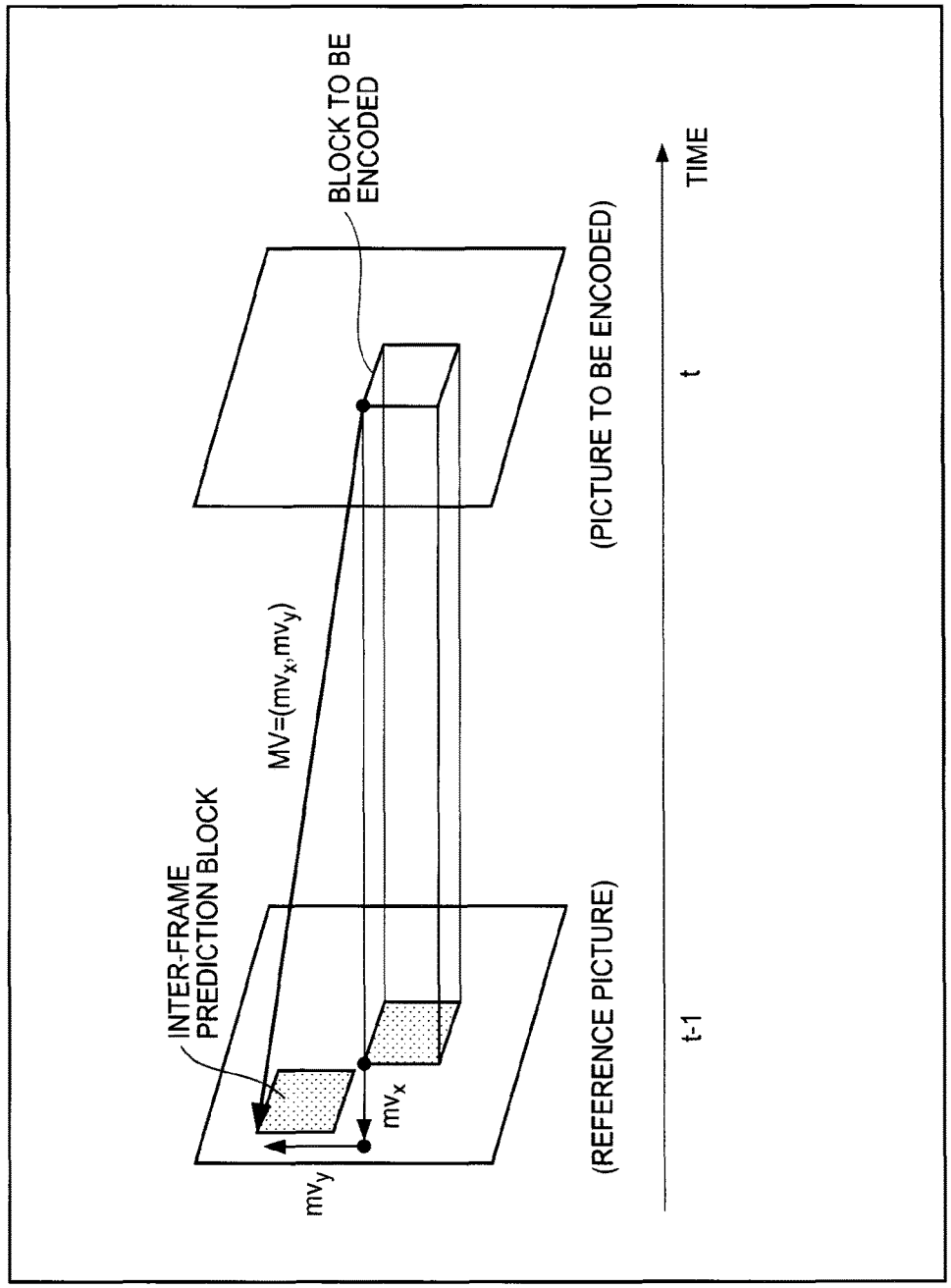
FIG. 27 It is an explanatory diagram depicting an example of inter-frame prediction using a 16×16 block size.

FIG. 1 is a block diagram depicting a video encoding device in Exemplary Embodiment 1. The video encoding device in this exemplary embodiment differs from the video encoding device depicted in FIG. 25 in a structure of a PCM encoder 1070. The PCM encoder 1070 in this exemplary embodiment includes a block counter 1071 for counting the number of successive PCM blocks, unlike the PCM encoder 107 depicted in FIG. 25. Though FIG. 1 depicts an example where the block counter 1071 is included in the PCM encoder 1070, this is not a limit for the present invention. The block counter 1071 may be provided in a part (e.g. the multiplexed data selector 109) other than the PCM encoder 1070, or provided independently of the components depicted in FIG. 1.

The video encoding device in this exemplary embodiment transmits the number of subsequent successive PCM blocks of the same block size as the first PCM block, only for PCM blocks of SCUs. In this exemplary embodiment, too, suppose there are four CUs (hereafter referred to as "blocks") to be encoded, and block 0 is a block (intra prediction or inter prediction) to be entropy-encoded and blocks 1 to 3 are each a block of PCM (PCM block) to be PCM-encoded, as depicted in (A) in FIG. 28. The CU size is externally set in the video encoding device.

A process relating to PCM blocks by the video encoding device is described below, with reference to FIG. 2.

The video encoding device in this exemplary embodiment operates as depicted in a flowchart in FIG. 2. In step S101, the block counter 1071 computes the number (subsequent_pcm_num) of subsequent PCM blocks of the same block size as the first PCM block. In the case of using the example depicted in (A) in FIG. 28, the computation result is subsequent_pcm_num=2.

In this description, pcm_flag syntax and pcm_alignment_zero_bit syntax included in a PU header of a CU in the PCM mode are referred to as "PCM block header". Note, however, that cu_split_pred_part_mode and split_coding_unit_flag which are a header of a CU in the PCM mode and pred_type which is a header of a PU of a CU in the PCM mode may also be referred to as "PCM block header".

In step S102, the entropy encoder 103 entropy-encodes the pcm_flag syntax. Next, in step S103, the entropy encoder 103 entropy-encodes the subsequent_pcm_num syntax. In this exemplary embodiment, the entropy-encoded pcm_flag syntax and subsequent_pcm_num syntax constitute the PCM block header of block 1.

In step S104, the entropy encoder 103 outputs a symbol that has not been output yet. Following this, in step S105, the entropy encoder 103 byte-aligns an output bitstream. That is, the entropy encoder 103 encodes the pcm_alignment_zero_bit syntax. In step S106, the entropy encoder 103 resets the encoding engine.

Figure 28:
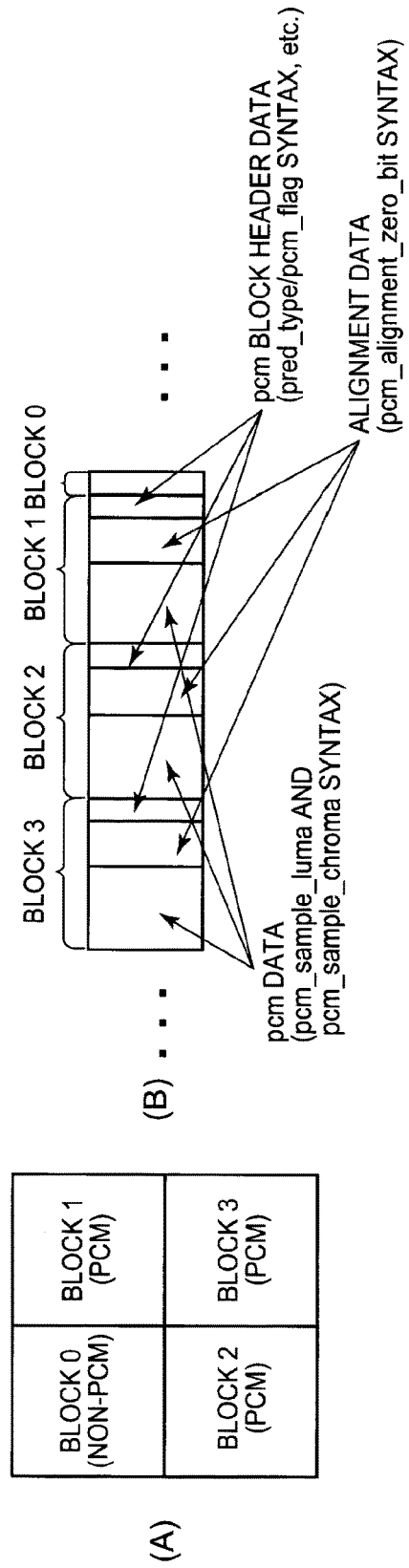
FIG. 28 It is an explanatory diagram of an example of a bitstream output from a multiplexer in the typical video encoding device.

In step S107, the PCM encoder 1070 encodes PCM data of the first PCM block (block 1 in the example depicted in (A) in FIG. 28) and the subsequent PCM blocks. That is, the PCM encoder 1070 encodes PCM data in order of blocks 1, 2, and 3.

The multiplexer 110 outputs a bitstream obtained by multiplexing the data encoded by the PCM encoder 1070 and the data encoded by the entropy encoder 103.

In this exemplary embodiment, coding tree syntax is signaled as indicated in list 1 depicted in FIGS. 3A and 3B, according to 7.3.5 Coding tree syntax in NPL 1. In FIGS. 3A and 3B, italicized elements are elements different from 7.3.5 Coding tree syntax in NPL 1.

Coding unit syntax is signaled as indicated in list 2 depicted in FIGS. 4A and 4B, in the same way as 7.3.6 Coding unit syntax in NPL 1.

Prediction unit syntax is signaled as indicated in list 3 depicted in FIGS. 5A, 5B, and 5C, according to 7.3.7 Prediction unit syntax in NPL 1. In FIGS. 5A, 5B, and 5C, italicized elements are elements different from 7.3.7 Prediction unit syntax in NPL 1.

The syntax indicated in lists 1 to 3 is syntax for transmitting the number of subsequent successive PCM blocks of the same block size as the first PCM block, only for PCM blocks of SCUs.

As is clear from the prediction unit syntax indicated in list 3, the subsequent PCM block number syntax subsequent_pcm_num, the alignment syntax pcm_alignment_zero_bit, and the PCM data syntax pcm_sample_luma/pcm_sample_chroma of the current PCM block and the subsequent PCM blocks are encoded following the pcm_flag syntax.

subsequent_pcm_num specifies the number of subsequent PCM blocks of log2CUsize that successively follow the current PCM block. subsequent_pcm_num can take a value in the range of 0 to 3. In the case where there is no subsequent_pcm_num, the value of subsequent_pcm_num is regarded as 0. The current PCM block mentioned here means the first PCM block of successive PCM blocks in the encoding and decoding processes.

When encoding the first block in the PCM mode, the video encoding device in this exemplary embodiment signals the number of successive blocks in the PCM mode, and performs the entropy encoding termination process. The video encoding device then signals PCM data for the number of successive blocks in the PCM mode (see FIGS. 5A to 5C).

Thus, the termination process is executed only in the first PCM block, and is not executed in the subsequent successive PCM blocks. As a result, compression performance degradation and compression efficiency degradation are prevented even especially when successive PCM blocks of small block size occur.

FIG. 6 depicts an example of entropy encoding of subsequent_pcm_num. The binary representation of the subsequent_pcm_num syntax in CABAC (Context-based Adaptive Binary Arithmetic Coding) is depicted in (A). The variable length code of the subsequent_pcm_num syntax in CAVLC (Context-based Adaptive Variable Length Coding) is depicted in (B).

Figure 7:
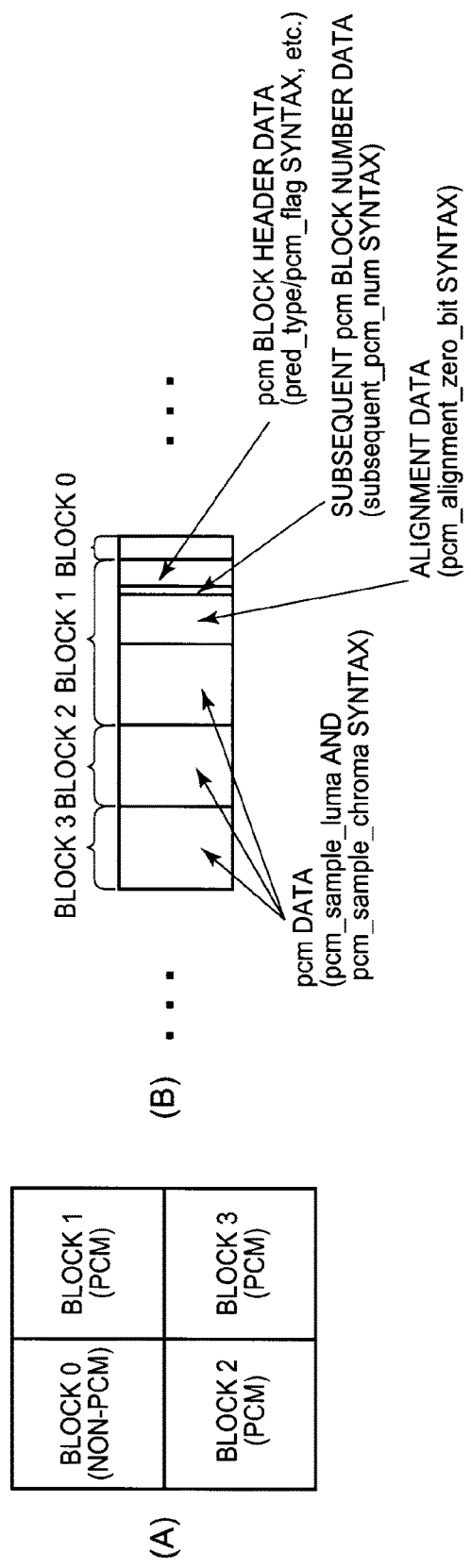
FIG. 7 It is an explanatory diagram of an example of a bitstream output from a multiplexer.

Suppose there are four CUs (hereafter referred to as "blocks") to be encoded, and block 0 is a block (intra prediction or inter prediction) to be entropy-encoded and blocks 1 to 3 are each a block of PCM (PCM block) to be PCM-encoded, as depicted in (A) in FIG. 7. The bitstream output from the multiplexer 110 includes a video bitstream of entropy-encoded block 0, as depicted in (B) in FIG. 7.

In this exemplary embodiment, regarding the three successive PCM blocks, a video bitstream of block 1 as a PCM block includes the pcm_flag syntax, the subsequent_pcm_num syntax, and the pcm_alignment_zero_bit syntax. Moreover, the pcm_sample_luma/pcm_sample_chroma syntax of blocks 1 to 3 as PCM blocks follows the pcm_alignment_zero_bit syntax of the video bitstream of block 1. In other words, the entropy encoding termination process is not needed in the blocks in the PCM mode that successively follow the first PCM block. Therefore, in this exemplary embodiment, compression performance degradation and compression efficiency degradation are prevented even when successive PCM blocks occur.

Exemplary Embodiment 2

Figure 8:
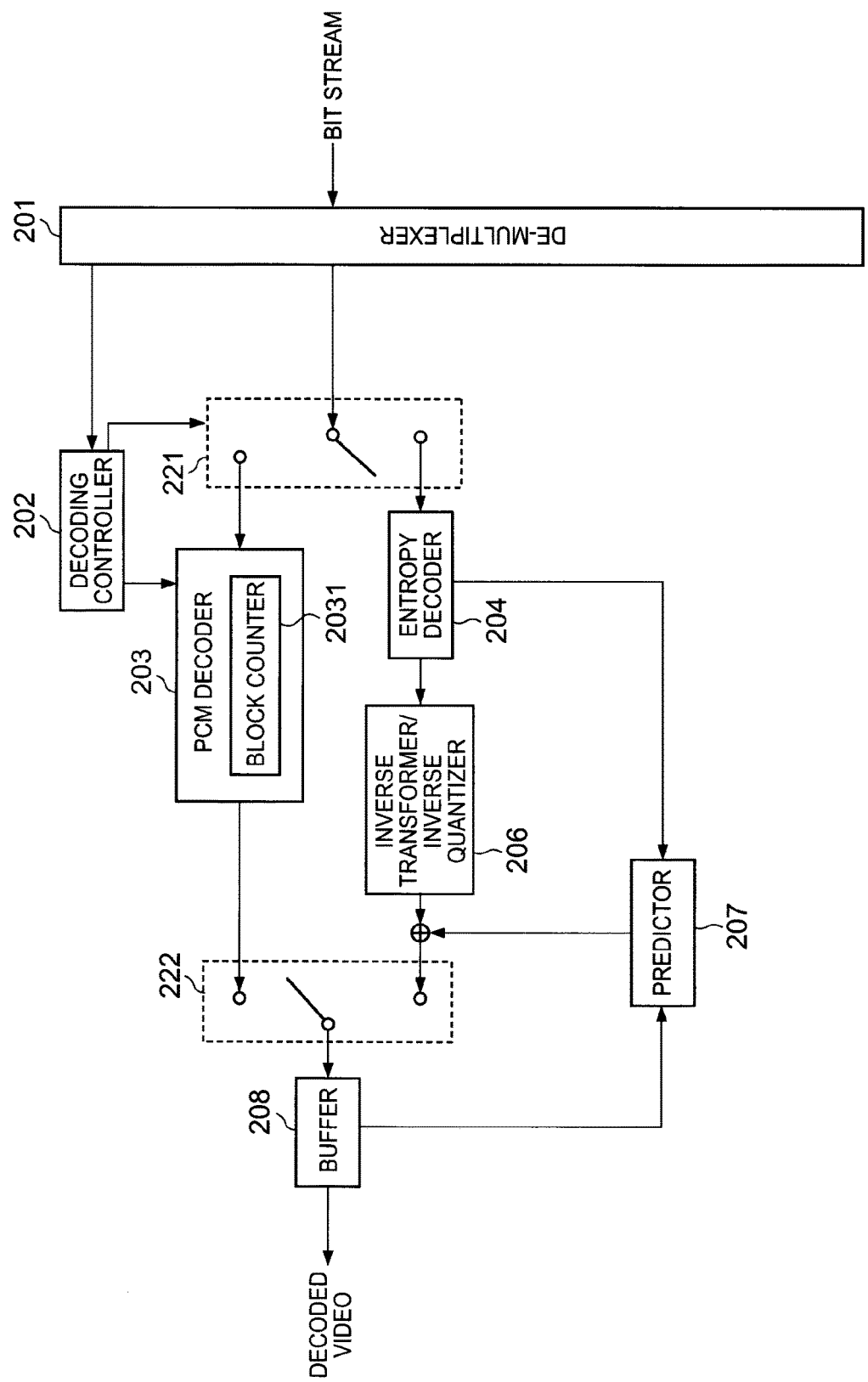
FIG. 8 It is a block diagram depicting a video decoding device in Exemplary Embodiment 2.

FIG. 8 is a block diagram depicting a video decoding device corresponding to the video encoding device in Exemplary Embodiment 1. The video decoding device in this exemplary embodiment includes a de-multiplexer 201, a decoding controller 202, a PCM decoder 203, an entropy decoder 204, an inverse transformer/inverse quantizer 206, a predictor 207, a buffer 208, a switch 221, and a switch 222. The PCM decoder 203 includes a block counter 2031 in which the number of PCM blocks is set. Though FIG. 8 depicts an example where the block counter 2031 is included in the PCM decoder 203, this is not a limit for the present invention. The block counter 2031 may be provided in a part (e.g. the decoding controller 202) other than the PCM decoder 203, or provided independently of the components depicted in FIG. 8.

The de-multiplexer 201 de-multiplexes an input bitstream, to extract an entropy-encoded or PCM-encoded video bitstream. The entropy decoder 204 entropy-decodes the video bitstream.

In the case where a CU to be decoded is not a PCM block (in the case where pcm_flag is 0 or there is no pcm_flag), the entropy decoder 204 entropy-decodes prediction parameters and a transform quantization value of the CU, and supplies them to the inverse transformer/inverse quantizer 206 and the predictor 207.

The inverse transformer/inverse quantizer 206 inverse-quantizes the transform quantization value with a quantization step width. The inverse transformer/inverse quantizer 206 further inverse-frequency-transforms a frequency transform coefficient obtained by the inverse quantization.

After the inverse frequency transform, the predictor 207 creates a prediction signal using an image of a reconstructed picture stored in the buffer 208, based on the entropy-decoded prediction parameters. After the creation of the prediction signal, the prediction signal supplied from the predictor 207 is added to the reconstructed prediction error image obtained by the inverse frequency transform by the inverse transformer/inverse quantizer 206, and the result is supplied to the switch 222. After the addition of the prediction signal, the decoding controller 202 changes the switch 222, and supplies the reconstructed prediction error image to which the prediction signal has been added, to the buffer 208 as the reconstructed image.

In the case where the CU to be decoded is a PCM block (in the case where pcm_flag is 1), the entropy decoder 204 decodes subsequent_pcm_num from the video bitstream, and computes the number of successive PCM blocks (1+subsequent_pcm_num). The entropy decoder 204 sets the number of successive PCM blocks, in the block counter 2031. The PCM decoder 203 reads PCM data for the number of successive PCM blocks from the received bitstream, and PCM-decodes the PCM data. That is, the PCM decoder 203 successively PCM-decodes the PCM data for the number of blocks set in the block counter 2031.

After the PCM decoding, the decoding controller 202 changes the switch 222, and supplies the PCM-decoded image of the CU to the buffer 208.

A process relating to PCM blocks by the video decoding device in this exemplary embodiment is described below, with reference to FIG. 9.

The video decoding device in this exemplary embodiment decodes subsequent successive PCM blocks of the same block size as the first PCM block, only for PCM blocks of SCUs.

Figure 9:
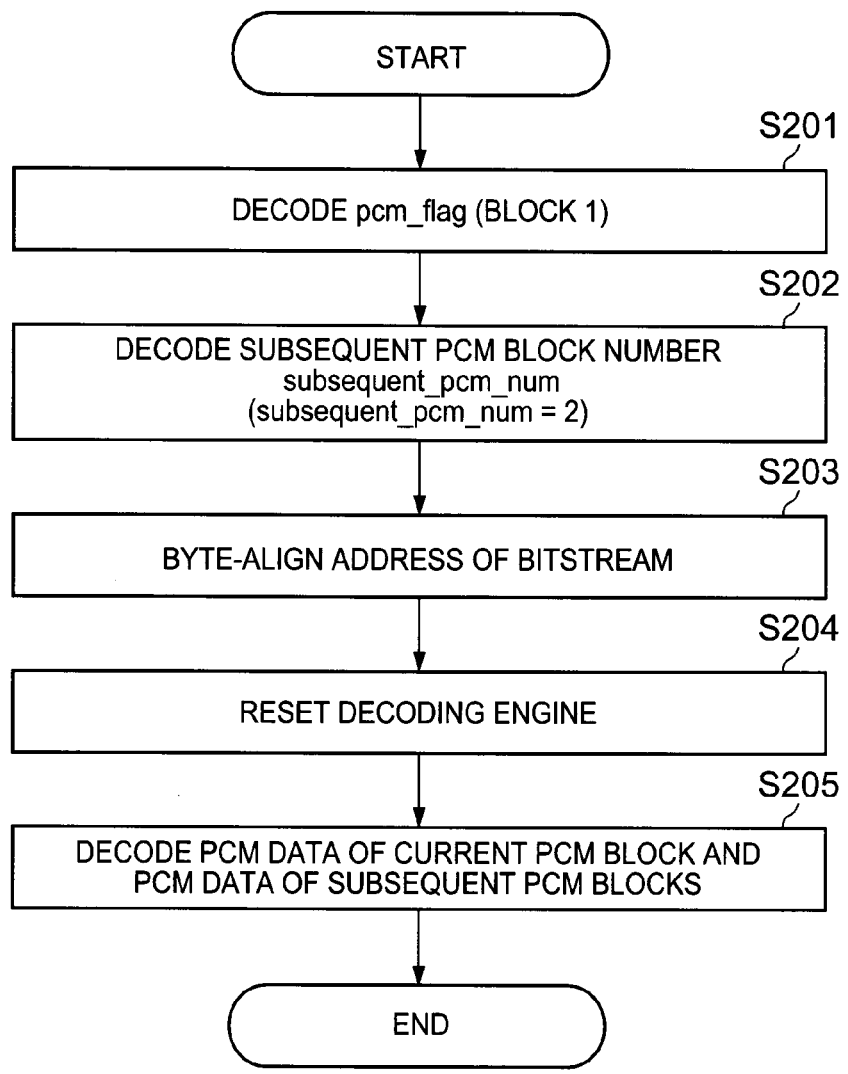
FIG. 9 It is a flowchart depicting an operation of the video decoding device in Exemplary Embodiment 2.

The video decoding device in this exemplary embodiment operates as depicted in a flowchart in FIG. 9. In step S201, the entropy decoder 204 decodes pcm_flag. In the case where the video encoding device encodes the CUs depicted in (A) in FIG. 7 as an example, the entropy decoder 204 decodes pcm_flag of block 1.

In step S202, the entropy decoder 204 decodes subsequent_pcm_num. In the case where the video encoding device encodes the CUs depicted in (A) in FIG. 7 as an example, subsequent_pcm_num=2. The number of successive PCM blocks (i.e. 1+subsequent_pcm_num) specified by subsequent_pcm_num is set in the block counter 2031, as mentioned above.

In step S203, the entropy decoder 204 byte-aligns the video bitstream that is in the process of being entropy-decoded (i.e. decodes the pcm_alignment_zero_bit syntax), according to an instruction by the decoding controller 202. Following this, in step S204, the entropy decoder 204 resets the decoding engine.

In step S205, the PCM decoder 203 decodes PCM data of the first PCM block (block 1 in the example depicted in (A) in FIG. 7) and the subsequent PCM blocks (blocks 2 and 3 in the example depicted in (A) in FIG. 7). In the example depicted in (A) in FIG. 7, the PCM decoder 203 decodes PCM data of three blocks (=subsequent_pcm_num+1) in order of blocks 1, 2, and 3.

Exemplary Embodiment 3

The video encoding device in Exemplary Embodiment 1 transmits the number of subsequent successive PCM blocks of the same block size as the first PCM block, only for PCM blocks of SCUs. The video decoding device in Exemplary Embodiment 2 receives the number of subsequent successive PCM blocks of the same block size as the first PCM block, only for PCM blocks of SCUs.

However, by the same device structure as in Exemplary Embodiment 1, the video encoding device can transmit subsequent_pcm_num which is the number of subsequent PCM blocks of the same block size as the first PCM block, without being limited to PCM blocks of SCUs. By the same device structure as in Exemplary Embodiment 2, the video decoding device can receive subsequent_pcm_num which is the number of subsequent PCM blocks of the same block size as the first PCM block and execute the decoding process, without being limited to PCM blocks of SCUs.

In Exemplary Embodiment 3, slice data syntax is signaled as indicated in list 4 depicted in FIG. 10, according to 7.3.4 Slice data syntax in NPL 1. In FIG. 10, italicized elements are elements different from 7.3.4 Slice data syntax in NPL 1.

Coding tree syntax is signaled as indicated in list 5 depicted in FIGS. 11A and 11B, according to 7.3.5 Coding tree syntax in NPL 1. In FIGS. 11A and 11B, italicized elements are elements different from 7.3.5 Coding tree syntax in NPL 1.

Coding unit syntax is signaled as indicated in list 6 depicted in FIGS. 12A and 12B, in the same way as 7.3.6 Coding unit syntax in NPL 1.

Prediction unit syntax is signaled as indicated in list 7 depicted in FIGS. 13A, 13B, and 13C, according to 7.3.7 Prediction unit syntax in NPL 1. In FIGS. 13A, 13B, and 13C, italicized elements are elements different from 7.3.7 Prediction unit syntax in NPL 1.

As is clear from the coding tree syntax depicted in FIGS. 11A and 11B, the CU header (cu_split_pred_part_mode/split_coding_unit_flag) of each PCM block (PCM block of NumPCMBlock>0) that follows the first PCM block (block of pcm_flag=1) is not encoded. Moreover, as is clear from the prediction unit syntax depicted in FIGS. 13A to 13C, the subsequent PCM block number syntax subsequent_pcm_num, the alignment syntax pcm_alignment_zero_bit, and the PCM data syntax pcm_sample_luma/pcm_sample_chroma of the first PCM block and the subsequent PCM blocks are encoded following the pcm_flag syntax which is the PCM block header of the first PCM block.

subsequent_pcm_num specifies the number of subsequent PCM blocks of log2CUsize that successively follow the current PCM block. subsequent_pcm_num can take a value in the range of 0 to 3. In the case where there is no subsequent_pcm_num, the value of subsequent_pcm_num is regarded as 0. The current PCM block mentioned here means the first PCM block of successive PCM blocks in the encoding and decoding processes.

Exemplary Embodiment 4

In the above exemplary embodiments, the video encoding device transmits the number of subsequent successive PCM blocks of the same block size as the first PCM block, and the video decoding device receives the number of subsequent successive PCM blocks of the same block size as the first PCM block.

However, by the same device structures as in the above exemplary embodiments, the video encoding device can transmit successive_pcm_num which is the number of successive PCM blocks including the first PCM block, and the video decoding device can receive successive_pcm_num which is the number of successive PCM blocks including the first PCM block and execute the decoding process.

The video encoding device in Exemplary Embodiment 4 operates as depicted in a flowchart in FIG. 14. In step S111, the block counter 1071 computes the number (successive_pcm_num) of successive PCM blocks. In the case of using the example depicted in (A) in FIG. 7, the computation result is successive_pcm_num=3.

In step S112, the entropy encoder 103 encodes successive_pcm_num.

In step S113, the entropy encoder 103 outputs a symbol that has not been output yet. In step S114, the entropy encoder 103 byte-aligns an output bitstream. That is, the entropy encoder 103 encodes pcm_alignment_zero_bit. In step S115, the entropy encoder 103 resets the encoding engine.

In step S116, the PCM encoder 1070 encodes PCM data of the successive PCM blocks (three blocks in the example depicted in (A) in FIG. 7). That is, the PCM encoder 1070 encodes PCM data in order of blocks 1, 2, and 3.

In this exemplary embodiment, slice data syntax is signaled as indicated in list 8 depicted in FIG. 15, according to 7.3.4 Slice data syntax in NPL 1. In FIG. 15, italicized elements are elements different from 7.3.4 Slice data syntax in NPL 1.

Coding tree syntax is signaled as indicated in list 9 depicted in FIGS. 16A and 16B, according to 7.3.5 Coding tree syntax in NPL 1. In FIGS. 16A and 16B, italicized elements are elements different from 7.3.5 Coding tree syntax in NPL 1.

Coding unit syntax is signaled as indicated in list 10 depicted in FIGS. 17A and 17B, in the same way as 7.3.6 Coding unit syntax in NPL 1.

Prediction unit syntax is signaled as indicated in list 11 depicted in FIGS. 18A, 18B, and 18C, according to 7.3.7 Prediction unit syntax in NPL 1. In FIGS. 18A, 18B, and 18C, italicized elements are elements different from 7.3.7 Prediction unit syntax in NPL 1.

The video encoding device in this exemplary embodiment transmits successive_pcm_num which is the number of successive PCM blocks of the same block size as the first PCM block. As is clear from the coding tree syntax depicted in FIGS. 16A and 16B, the CU header (cu_split_pred_part_mode/split_coding_unit_flag) of each PCM block (PCM block of NumPCMBlock>0) following the first PCM block is not encoded. Moreover, as is clear from the prediction unit syntax depicted in FIGS. 18A to 18C, the successive PCM block number successive_pcm_num and the alignment syntax pcm_alignment_zero_bit are encoded in the first PCM block, and the PCM data syntax pcm_sample_luma/pcm_sample_chroma of the subsequent PCM blocks is encoded following pcm_alignment_zero_bit of the first PCM block.

successive_pcm_num specifies the number of successive PCM blocks of log2CUsize from the current PCM block. successive_pcm_num can take a value in the range of 0 to 4. In the case where there is no successive_pcm_num, the value of successive_pcm_num is regarded as 0. The current PCM block mentioned here means the first PCM block of successive PCM blocks in the encoding and decoding processes. In detail, a block having successive_pcm_num greater than 0 is the first PCM block, and a block having NumPCMBlock greater than 0 is a PCM block.

FIG. 19 depicts an example of entropy encoding of successive_pcm_num. The binary representation of the successive_pcm_num syntax in CABAC is depicted in (A). The variable length code of the successive_pcm_num syntax in CAVLC is depicted in (B).

Figure 20:
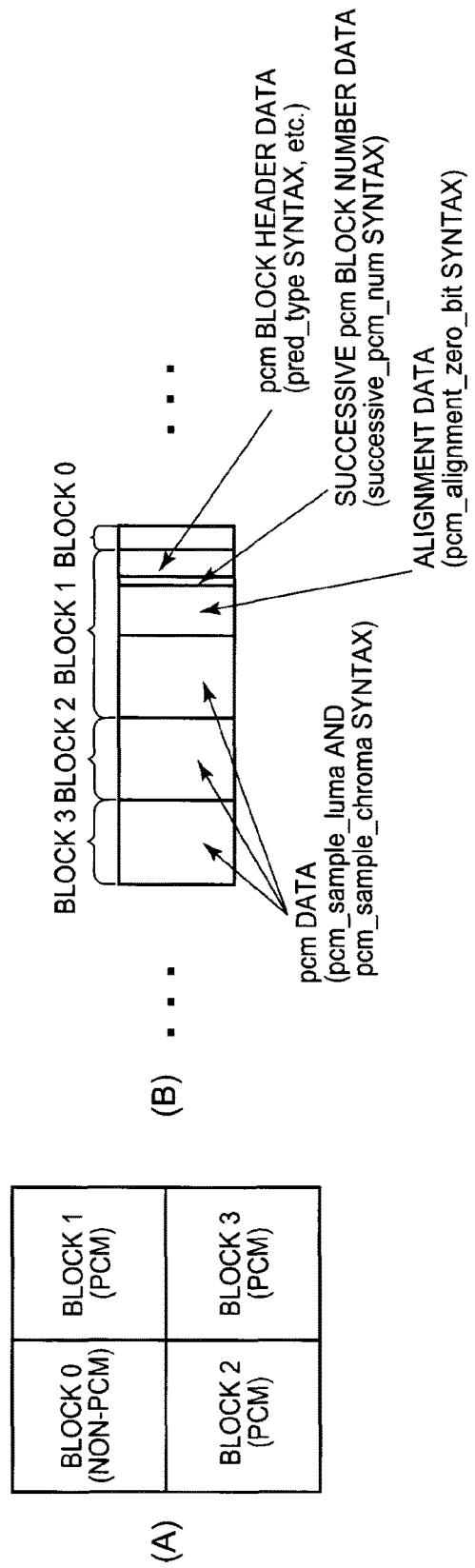
FIG. 20 It is an explanatory diagram of an example of a bitstream output from a multiplexer.

Suppose there are four CUs (hereafter referred to as "blocks") to be encoded, and block 0 is a block (intra prediction or inter prediction) to be entropy-encoded and blocks 1 to 3 are each a block of PCM (PCM block) to be PCM-encoded, as depicted in (A) in FIG. 20. The bitstream output from the multiplexer 110 includes a video bitstream of entropy-encoded block 0, as depicted in (B) in FIG. 20.

In this exemplary embodiment, regarding the three successive PCM blocks, a video bitstream of block 1 as a PCM block includes the successive_pcm_num syntax and the pcm_alignment_zero_bit syntax. Moreover, the pcm_sample_luma/pcm_sample_chroma syntax of blocks 1 to 3 as PCM blocks follows the pcm_alignment_zero_bit syntax of the video bitstream of block 1. In other words, the entropy encoding termination process is not needed in the blocks in the PCM mode that successively follow the first PCM block. Therefore, in this exemplary embodiment, compression performance degradation and compression efficiency degradation are prevented even when successive PCM blocks occur.

A process relating to PCM blocks by the video decoding device in this exemplary embodiment is described below, with reference to FIG. 21.

The video decoding device in this exemplary embodiment operates as depicted in a flowchart in FIG. 21. In step S211, the entropy decoder 204 decodes successive_pcm_num. In the case where the video encoding device encodes the CUs depicted in (A) in FIG. 20 as an example, successive_pcm_num=3. The number of successive PCM blocks specified by successive_pcm_num is set in the block counter 2031.

In step S212, the entropy decoder 204 byte-aligns the video bitstream that is in the process of being entropy-decoded (i.e. decodes the pcm_alignment_zero_bit syntax), according to an instruction by the decoding controller 202. In step S213, the entropy decoder 204 resets the decoding engine.

In step S214, the PCM decoder 203 decodes PCM data of the successive PCM blocks. That is, the PCM decoder 203 successively PCM-decodes PCM data for the number of blocks set in the block counter 2031. In the example depicted in (A) in FIG. 20, the PCM decoder 203 decodes PCM data of three blocks (=successive_pcm_num) in order of blocks 1, 2, and 3.

Note that the values that can be taken by subsequent_pcm_num and the values that can be taken by successive_pcm_num differ depending on the position of the first PCM block (quadtree block position), i.e. depending on whether it is block 0, 1, 2, or 3. This is because the number of leaves of one quadtree is four.

Hence, in each of the above exemplary embodiments, it is effective to switch the binary representation in CABAC and the variable length code in CAVLC according to the position of the first PCM block.

The binary representation of the subsequent_pcm_num syntax in CABAC adaptive to the position of the first PCM block is depicted in (A) in FIG. 22 as an example. The variable length code of the subsequent_pcm_num syntax in CAVLC adaptive to the position of the first PCM block is depicted in (B) in FIG. 22 as an example. NA denotes that no information is transmitted from the transmission side. In other words, in the case of NA, the value of subsequent_pcm_num is specified by the position of the first PCM block.

The binary representation of the successive_pcm_num syntax in CABAC adaptive to the position of the first PCM block is depicted in (A) in FIG. 23 as an example. The variable length code of the successive_pcm_num syntax in CAlVC adaptive to the position of the first PCM block is depicted in (B) in FIG. 23 as an example.

As is clear from the above exemplary embodiments, the features of the video encoding device according to the present invention include: means for counting the number of successive PCM-encoded blocks; means for embedding the counted number of successive PCM-encoded blocks, into a header of a first PCM block; and means for successively multiplexing PCM data of the successive PCM-encoded blocks, into a bitstream.

Likewise, as is clear from the above exemplary embodiments, the features of the video decoding device according to the present invention include: means for extracting the number of successive PCM-encoded blocks from a header of a first PCM block; and means for successively reading PCM data of the successive PCM-encoded blocks, from a bitstream.

In the above exemplary embodiments, successive PCM blocks are PCM blocks of the same block size successive in encoding order (or decoding order) (according to the definition of subsequent_pcm_num in FIGS. 5C and 13C and the definition of successive_pcm_num in FIG. 18C). In addition, the successive PCM blocks belong to the same LCU, and the CU (parent CU) to which each of the successive PCM blocks directly belongs in the CU coding tree is the same, according to the definition of the range of the number of successive PCM blocks and the definition of the slice data syntax, the coding tree syntax, and the prediction unit syntax. That is, successive PCM blocks in the present invention belong to the same LCU, belong to the same parent CU, and are PCM blocks of the same block size successive in encoding order (or decoding order).

Hence, subsequent_pcm_num in FIGS. 5C and 13C may be defined as "subsequent_pcm_num specifies the number of the subsequent coding units coded by I_PCM with the current log2CUSize that share the same parent node as the current I_PCM coding unit and successively follow the current I_PCM coding unit in decoding order. The value num_subsequent_pcm shall be in the range of 0 to 3, inclusive".

In the above exemplary embodiments, the number of successive PCM blocks is represented by the subsequent_pcm_num syntax or the successive_pcm_num syntax. Such syntax is equivalent to representing the number (the number of successive "1" pcm_flags) of pcm_flags of the value "1" successive in encoding order (or decoding order). The video encoding device according to the present invention can therefore be interpreted as a video encoding device that embeds the number of successive "1" pcm_flags into a PCM header. Likewise, the video decoding device according to the present invention can be interpreted as a video decoding device that de-multiplexes a bitstream including the number of successive "1" pcm_flags.

In the exemplary embodiments using the subsequent_pcm_num syntax and CABAC described above, an exemplary embodiment of directly embedding the binary representation of the subsequent_pcm_num syntax, i.e. the number of successive PCM-encoded blocks, into the bitstream is also possible.

This may be simply realized as follows. In the video encoding device in each of Exemplary Embodiments 1 and 3, after entropy-encoding the pcm_flag syntax, the entropy encoder 103 outputs a symbol that has not been output yet, and directly embeds the binary representation of the subsequent_pcm_num syntax into the bitstream (that is, steps S103 and S104 in FIG. 2 are reversed). In the corresponding video decoding device in each of Exemplary Embodiments 2 and 4, after decoding the pcm_flag syntax, the entropy decoder 204 directly reads the binary representation of the subsequent_pcm_num syntax from the bitstream and decodes it (that is, the steps in FIG. 9 are unchanged).

Thus, the exemplary embodiment of directly embedding the binary representation of the subsequent_pcm_num syntax into the bitstream is obviously equivalent to switching from CABAC to the variable length code in CAVLC, given that the binary representation and the variable length code are in a one-to-one correspondence in FIGS. 6 and 22.

In the above exemplary embodiments, the number of successive PCM blocks is designated in the first PCM block, using the subsequent_pcm_num syntax or the successive_pcm_num syntax. In a video encoding scheme of transmitting a quantization parameter QP of a PCM block, the QP of each of the successive PCM blocks may be designated in the first PCM block, after the number of successive PCM blocks.

For example, the designation may be made by fixed-length-encoding cu_qp_plus_qp_bd_offset_y syntax, where cu_qp_plus_qp_bd_offset_y=QP+QpBdOffset is defined. QpBdOffset is an offset parameter determined by the range of the QP. By designating the successive cu_qp_plus_qp_bd_offset_y syntax in the first PCM block, the video encoding device can successively transmit the PCM data for the number of successive PCM blocks. Moreover, the video decoding device can successively receive the PCM data for the number of successive PCM blocks.

In the above-mentioned video encoding scheme using the cu_qp_plus_qp_bd_offset_y syntax, PCM blocks for which the cu_qp_plus_qp_bd_offset_y syntax is transmitted may be limited to a predetermined block size. For instance, limiting to a block size greater than or equal to a minimum transmission block size for the QP can simplify the QP-related processes by the video encoding device and the video decoding device.

Each of the above exemplary embodiments may be realized by hardware, or realized by a computer program.

Figure 24:
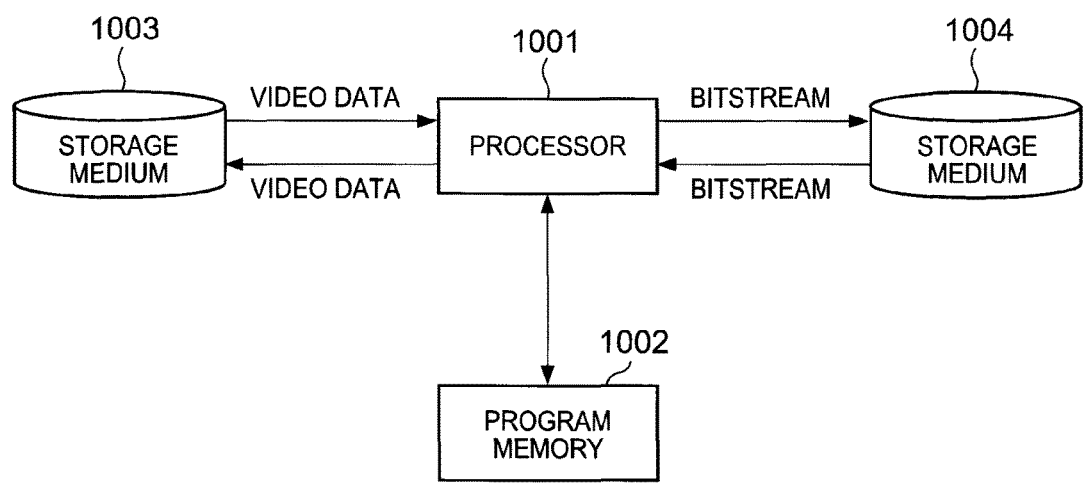
FIG. 24 It is a block diagram depicting an example of a structure of an information processing system capable of realizing functions of a video encoding device and a video decoding device according to the present invention.

An information processing system depicted in FIG. 24 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. As a storage medium, a magnetic storage medium such as a hard disk is available.

In the information processing system depicted in FIG. 24, a program for realizing the functions of the blocks depicted in each of FIGS. 1 and 8 is stored in the program memory 1002. The processor 1001 realizes the functions of the video encoding device or the video decoding device depicted in FIG. 1 or 8, by executing processes according to the program stored in the program memory 1002.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2011-240538 filed on Nov. 1, 2011 and Japanese Patent Application No. 2012-085821 filed on Apr. 4, 2012, the disclosures of which are incorporated herein in their entirety.

REFERENCE SIGNS LIST 102 transformer/quantizer
103 entropy encoder
104 inverse transformer/inverse quantizer
105 buffer
106 predictor
107 PCM encoder
108 PCM decoder
109 multiplexed data selector
110 multiplexer
121 switch
122 switch
201 de-multiplexer
202 decoding controller
203 PCM decoder
204 entropy decoder
206 inverse transformer/inverse quantizer
207 predictor
208 buffer
221 switch
222 switch
1001 processor
1002 program memory
1003 storage medium
1004 storage medium
1070 PCM encoder 1071 block counter
2031 block counter

The invention claimed is:

1. A video encoding device comprising:
a memory storing instructions; and
one or more processors configured to execute the instructions to:
transform at least one image block, wherein a size of the at least one image block is predetermined;
entropy-encode transformed data of the transformed at least one image block;
Pulse Code Modulation (PCM)-encode the transformed data of the transformed at least one image block;
select at least one of entropy-encoded data or PCM-encoded data for each transformed image block;
entropy-encode a PCM flag;
entropy-encode a number of one or more successive image blocks encoded by the PCM-encoding;
entropy-encode alignment data for byte aligning a starting point of a first image block of the one or more successive image blocks; and
output a bitstream obtained by multiplexing output data of the entropy encoding and output data of the PCM-encoding,
wherein a transformed image block or image blocks of the transformed at least one image block, other than the first image block, do not include the alignment data, whereas the first image block includes the alignment data.

2. A video decoding device comprising:
a memory storing instructions; and
one or more processors configured to execute the instructions to:
de-multiplex a bitstream, the bitstream including an encoded number of successive image blocks encoded by Pulse Code Modulation (PCM)-encoding and encoded alignment data for byte aligning a starting point of a first image block encoded by PCM-encoding of one or more successive image blocks encoded by PCM-encoding;
successively PCM-decode the PCM-encoded data for the encoded number of successive image blocks encoded by PCM-encoding; and
entry-decode transformed data of an image included in the bitstream,
wherein image blocks other than the first image block do not include the alignment data, and the first image block includes the alignment data.

3. A video encoding method, the method comprising:
transforming at least one image block;
entropy-encoding transformed data of the transformed at least one image block;
Pulse Code Modulation (PCM)-encoding an image block;
selecting output data of the entropy-encoding or output data of the PCM-encoding;
entropy-encoding a PCM flag;
entropy-encoding a number of one or more successive image blocks encoded by the PCM-encoding;
entropy-encoding alignment data for byte aligning a starting point of a first image block of the one or more successive image blocks; and
outputting a bitstream obtained by multiplexing output data of the entropy-encoding and output data of the PCM-encoding,
wherein a transformed image block or image blocks of the transformed at least one image block, other than the first image block, do not include the alignment data, whereas the first image block includes the alignment data.

4. A video decoding method, the method comprising:
de-multiplexing a bitstream, the bitstream including an encoded number of successive image blocks encoded by Pulse Code Modulation (PCM)-encoding and encoded alignment data for byte aligning a starting point of a first image block encoded by PCM-encoding of the one or more successive image blocks encoded by PCM-encoding;
successively PCM-decoding the PCM-encoded data for the encoded number of successive image blocks encoded by PCM-encoding; and
entropy-decoding transformed data of an image included in the bitstream,
wherein image blocks other than the first image block do not include the alignment data, and the first image block includes the alignment data.

5. A non-transitory computer readable information recording medium storing a video encoding program and instructions that, when executed by a processor, cause the processor to perform a method, the method comprising:
transforming at least one image block;
entropy-encoding transformed data of the transformed at least one image block;
Pulse Code Modulation (PCM)-encoding an image block;
selecting output data of the entropy-encoding or output data of the PCM-encoding;
entropy-encoding a PCM flag;
entropy-encoding a number of one or more successive image blocks encoded by the PCM-encoding;
entropy-encoding alignment data for byte aligning a starting point of a first image block of the one or more successive image blocks; and
outputting a bitstream obtained by multiplexing output data of the entropy-encoding and output data of the PCM-encoding,
wherein a transformed image block or image blocks of the transformed at least one image block, other than the first image block, do not include the alignment data, whereas the first image block includes the alignment data.

6. A non-transitory computer readable information recording medium storing a video decoding program and instructions that, when executed by a processor, cause the processor to perform a method, the method comprising:
de-multiplexing a bitstream, the bitstream including an encoded number of successive image blocks encoded by Pulse Code Modulation (PCM)-encoding and encoded alignment data for byte aligning a starting point of a first image block encoded by PCM-encoding of the one or more successive image blocks encoded by PCM-encoding;
successively PCM-decoding the PCM-encoded data for the encoded number of successive image blocks encoded by PCM-encoding; and
entropy-decoding transformed data of an image included in the bitstream,
wherein image blocks other than the first image block do not include the alignment data, whereas the first image block includes the alignment data.

* * * * *